(12) United States Patent
Cekorich et al.

(10) Patent No.: US 6,556,509 B1
(45) Date of Patent: *Apr. 29, 2003

(54) DEMODULATOR AND METHOD FOR INTERFEROMETRIC OUTPUTS OF INCREASED ACCURACY

(75) Inventors: Allen Curtis Cekorich, Walnut Creek, CA (US); Joseph Grau Davis, Lafayette, CA (US)

(73) Assignee: Optiphase, Inc., Van Nuys, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,696

(22) Filed: Nov. 8, 1999

(51) Int. Cl.[7] ................................................. G01B 9/02
(52) U.S. Cl. ........................................ 365/477; 356/460
(58) Field of Search ................................ 356/477, 478, 356/460; 250/227.19, 227.27; 385/12

(56) References Cited

U.S. PATENT DOCUMENTS 4,789,240 A * 12/1988 Bush ............................ 356/477
5,903,350 A * 5/1999 Bush et al. ................... 358/478

* cited by examiner

Primary Examiner—Samuel A. Turner
(74) Attorney, Agent, or Firm—George W. Finch

(57) ABSTRACT

An apparatus and method is presented to provide wide dynamic range balanced measurements of the input phase to an interferometer using a phase generated carrier especially useful utilizing time multiplexing to demodulate a series of interferometers with high accuracy. A modulation drive output is provided by the invention and maintained under operation at the optimum amplitude by an internal feedback loop. The resulting highly stable system which is time balanced, can be fabricated from an analog to digital converter, a digital signal processor, and a digital to analog converter making low cost open loop demodulators a reality.

27 Claims, 13 Drawing Sheets

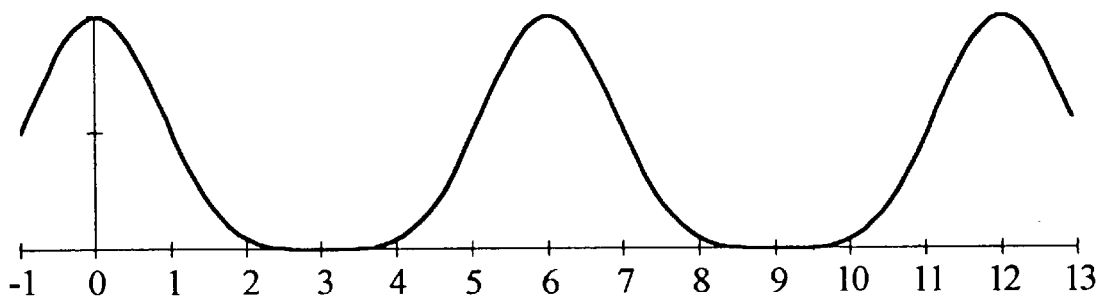
FIG. 2A   $V(t)=2+2\cos(0\pi+\pi\cdot\sin(t+0\pi))$
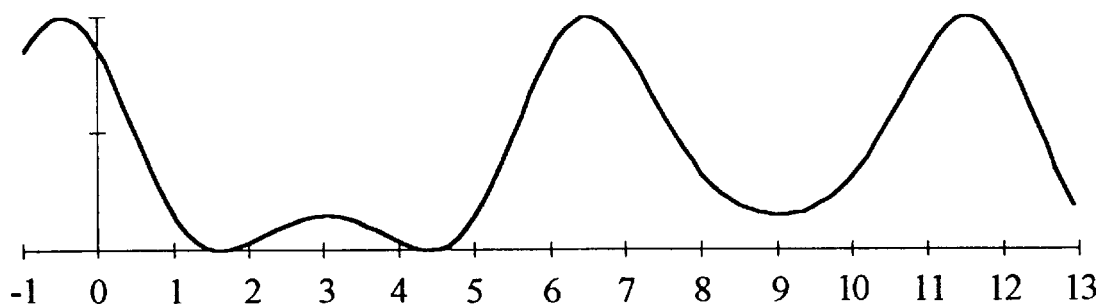
FIG. 2B   $V(t)=2+2\cos(0.25\pi+\pi\cdot\sin(t+0\pi))$
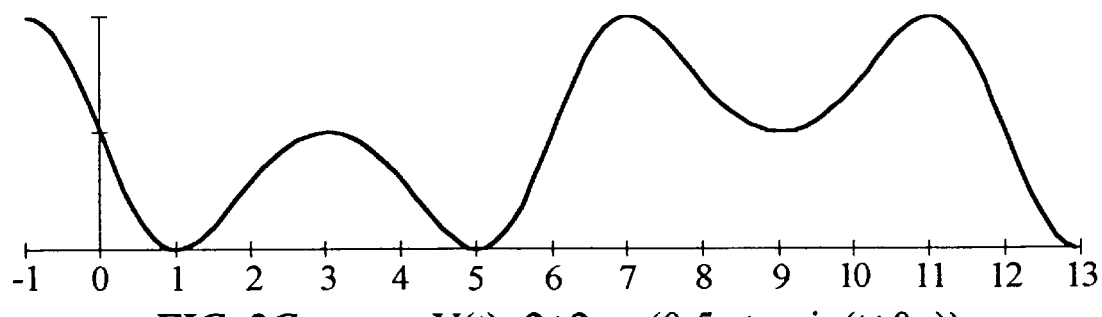
FIG. 2C   $V(t)=2+2\cos(0.5\pi+\pi\cdot\sin(t+0\pi))$
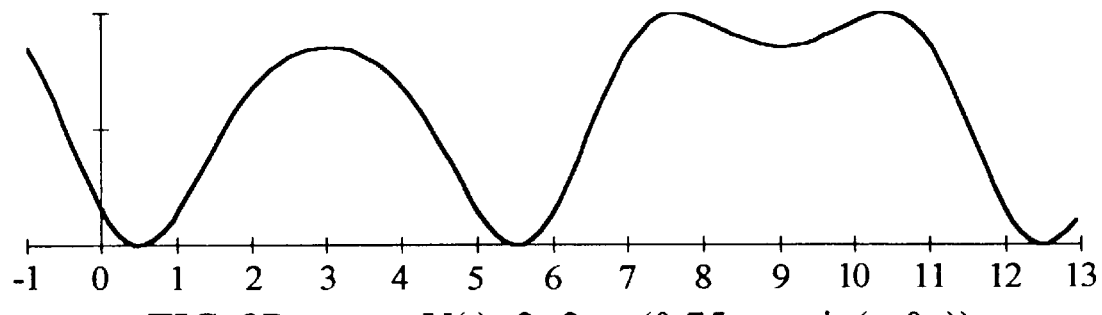
FIG. 2D   $V(t)=2+2\cos(0.75\pi+\pi\cdot\sin(t+0\pi))$

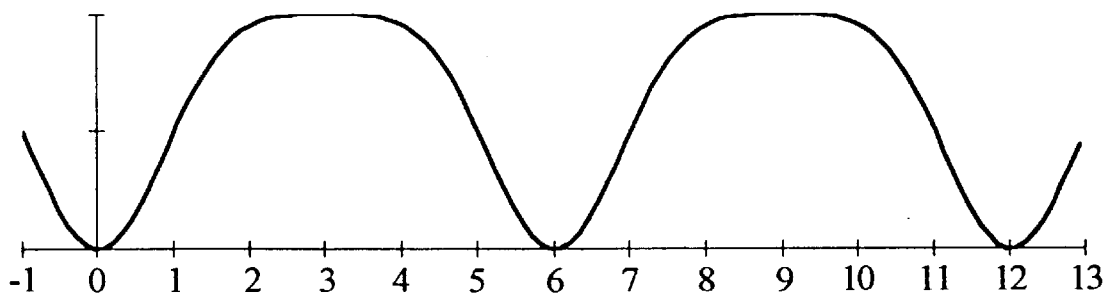
FIG. 2E   $V(t)=2+2\cos(1\pi+\pi\cdot\sin(t+0\pi))$
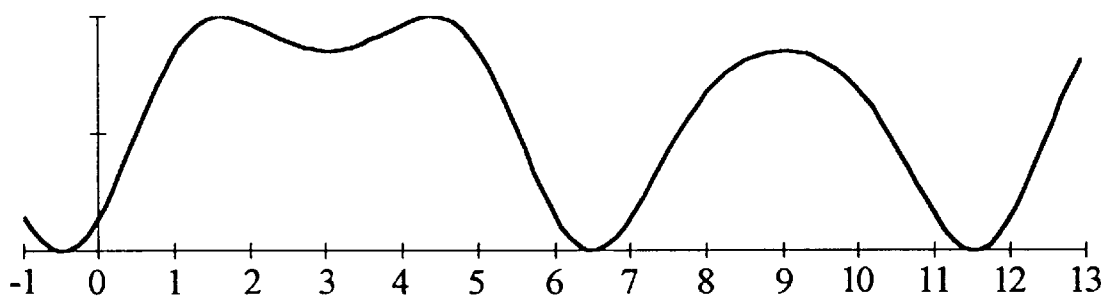
FIG. 2F   $V(t)=2+2\cos(1.25\pi+\pi\cdot\sin(t+0\pi))$
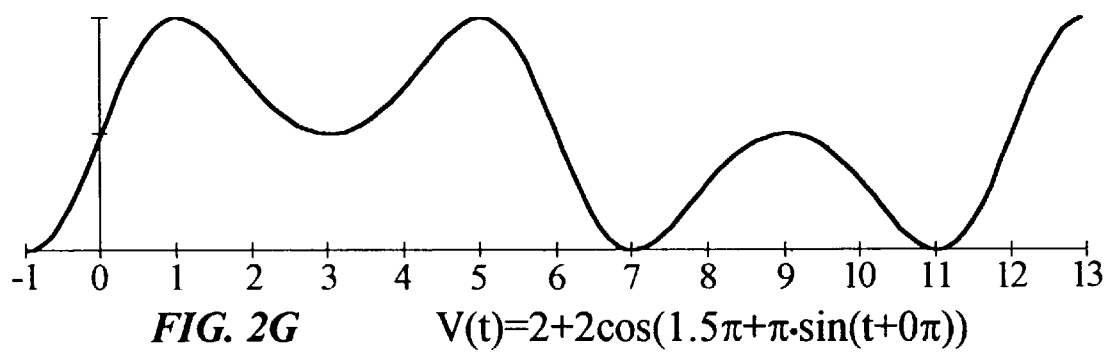
FIG. 2G   $V(t)=2+2\cos(1.5\pi+\pi\cdot\sin(t+0\pi))$
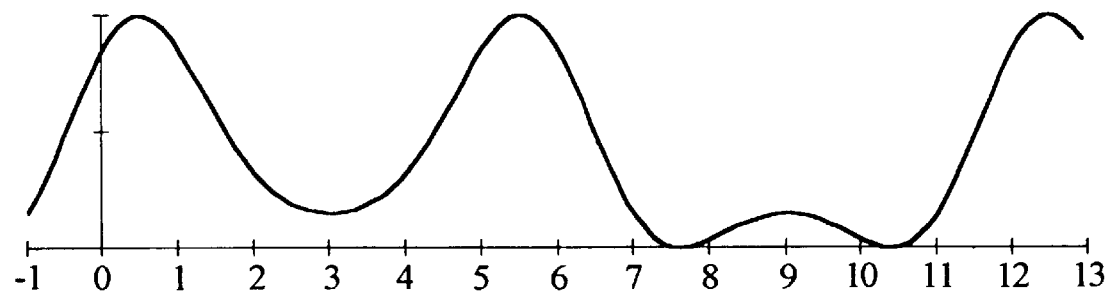
FIG. 2H   $V(t)=2+2\cos(1.75\pi+\pi\cdot\sin(t+0\pi))$

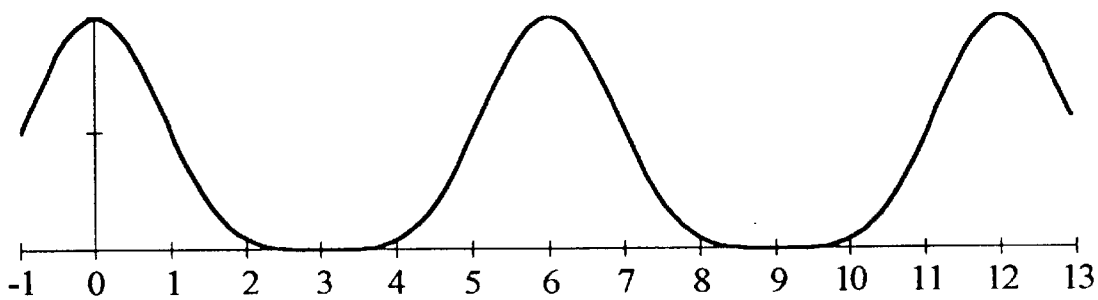
FIG. 2I  $V(t)=2+2\cos(2\pi+\pi\cdot\sin(t+0\pi))$
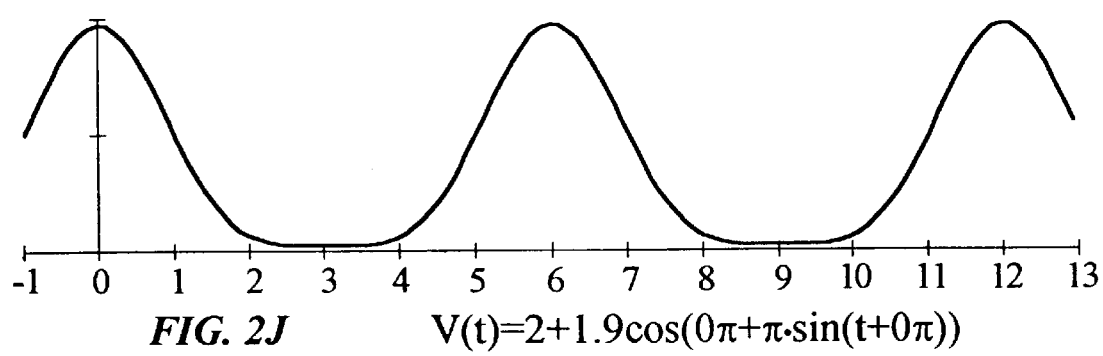
FIG. 2J  $V(t)=2+1.9\cos(0\pi+\pi\cdot\sin(t+0\pi))$
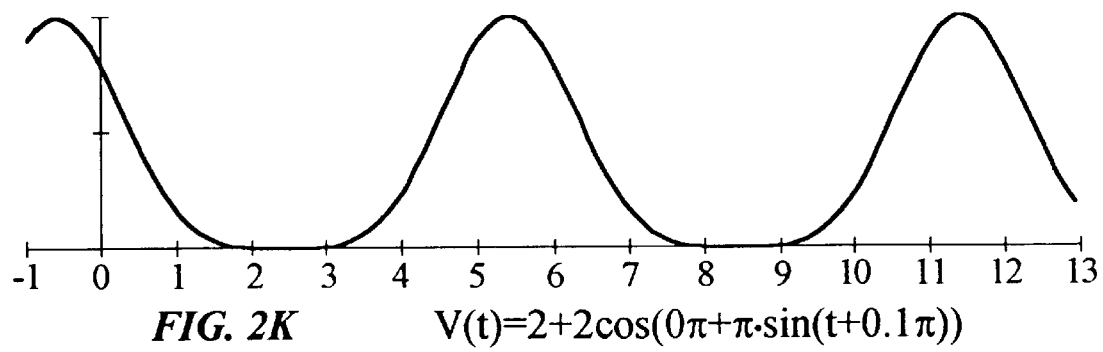
FIG. 2K  $V(t)=2+2\cos(0\pi+\pi\cdot\sin(t+0.1\pi))$
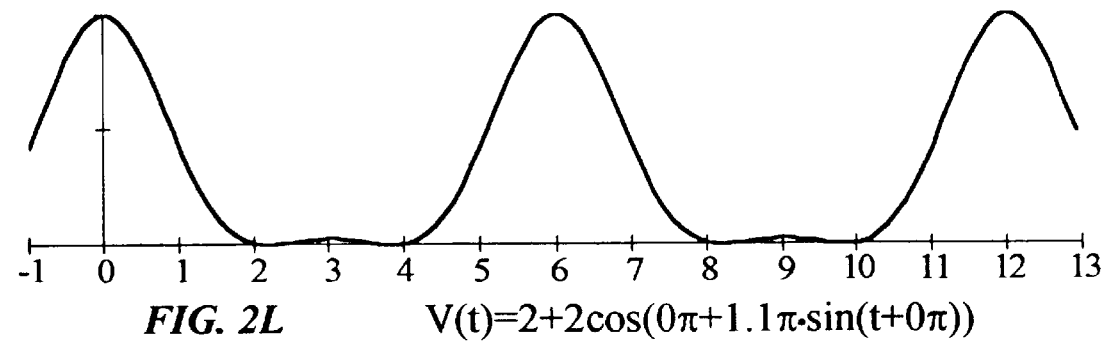
FIG. 2L  $V(t)=2+2\cos(0\pi+1.1\pi\cdot\sin(t+0\pi))$

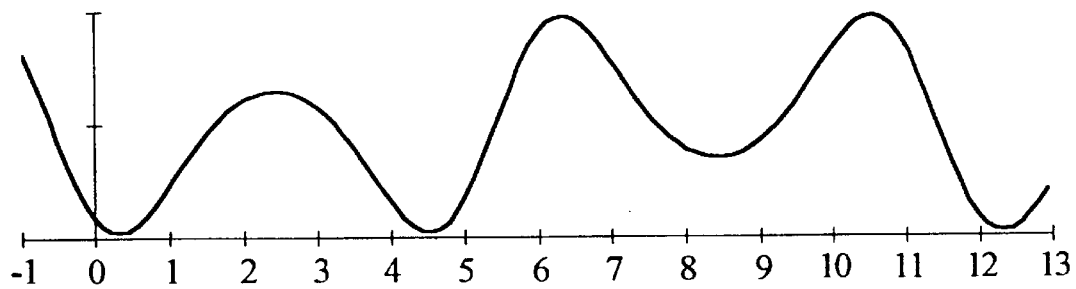
FIG. 2M   $V(t)=2+1.9\cos(0.5\pi+1.1\pi\cdot\sin(t+0.1\pi))$
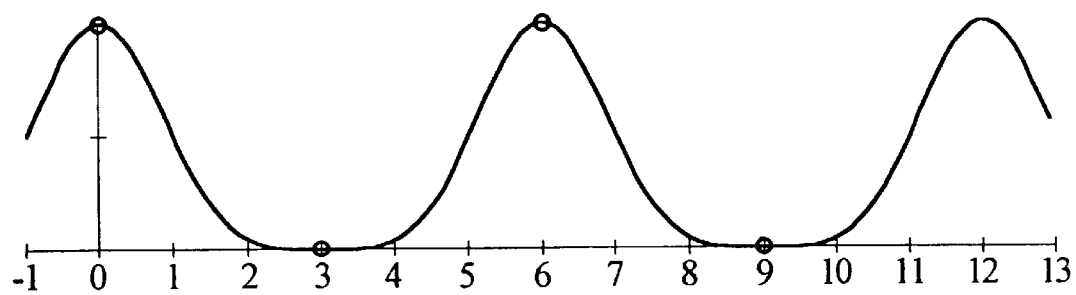
FIG. 3A
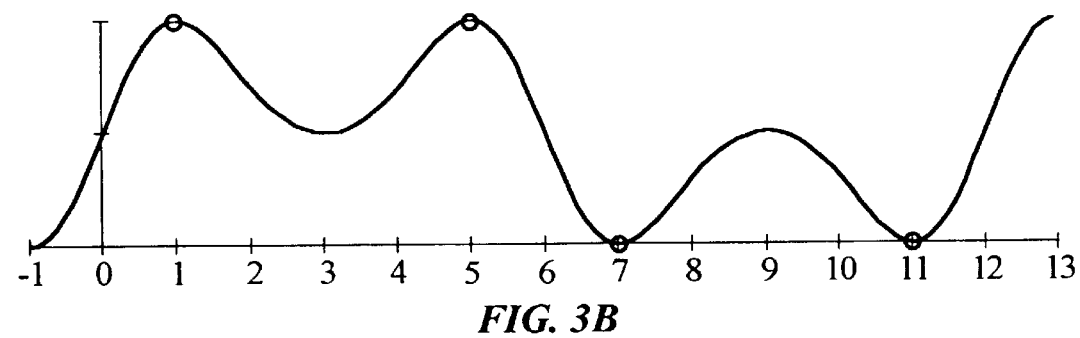
FIG. 3B

US 6,556,509 B1

DEMODULATOR AND METHOD FOR INTERFEROMETRIC OUTPUTS OF INCREASED ACCURACY

FIELD OF INVENTION

The invention relates generally to interferometers and especially to apparatus and methods for measuring the input phase shift between two interfering waves where the phase shift has been summed with a modulation phase shift, such as one that has been stepped, whose amplitude and phase may be controlled to provide highly stable and wide dynamic range measurements of the input phase balanced in time for additional accuracy.

BACKGROUND OF THE INVENTION

The analog output of an interferometer represents the combined power of two distinct waves. In general the two waves will interfere resulting in an average power that depends upon the cosine of the phase shift θ between the two waves. The analog output V of a detector, which measures the combined power is given by:

$$V = P_{dc} + P_{ac} \cos(\theta)$$

where, $P_{dc}$ is an offset and $P_{ac}$ is the gain of the interferometer output. Optical interferometers are the most common devices having this analog output and many utilize fiber optics to guide light waves. In optical sensor applications, an external parameter will proportionally change the phase of one or both of the light waves and the resulting change in the analog output of the light detector of the interferometer is used to sense that parameter. Examples of parameters that can affect the phase of light waves are rotation, pressure and magnetic fields. If R is the input phase shift of the interferometer induced by the parameter and r the phase shift due to other causes, then the analog output is:

$$V = P_{dc} + P_{ac} \cos(R+r)$$

This analog output V, must be used in some manner to measure the input phase R to build a useful sensor system. As it normally occurs, the analog output V is not very useful, because it is a nonlinear function of the input phase R, resulting in no output changes and sign ambiguities at many periodic operating points. Also, when R is to be measured with DC accuracy, the offset $P_{dc}$ obscures the result. Finally, changes in $P_{dc}$ or $P_{ac}$ within the bandwidth of R corrupt the measurement.

These well known limitations are the reasons that phase modulation is introduced into the system. One embodiment of the present invention is concerned with sinusoid phase modulations that are commonly known as "Phase Generated Carrier" or PGC approaches from "Homodyne Demodulation Scheme for Fiber Optic Sensors Using Phase Generated Carrier", IEEE Journal of Quantum Electronics, October 1982, QE-18, No 10, pp. 1647–1653; Dandridge et al. In such systems, a device is present in the interferometer that introduces a phase shift at a constant frequency resulting in an analog output of:

$$V(t) = P_{dc} + P_{ac} \cos\{R + M \sin(t+W)\}$$

where M is the modulation depth of the interferometer, W is the phase of the modulation of the interferometer and t is the linearly increasing time in units of radians. The modulation phase defined by the term:

$$M \sin(t+W)$$

in the cosine argument is the result of a single frequency sinusoidal drive output applied to the interferometer. The way in which this drive output creates the modulation phase depends on the design of the interferometer. In rotation sensors commonly made out of Sagnac interferometers, the time difference of the sine drive output applied to a phase shifter inside the Sagnac loop gives the modulation. In time domain multiplexed acoustic sensors fabricated from Michelson interferometers, a sinusoidal variation of the light source current will induce wavelength changes which will cause the modulation phase given above. In the simplest modulator case, a fiber wrapped on a piezoelectric cylinder is placed in one arm of a Mach-Zehnder interferometer to transform its sinusoid drive into the modulation phase.

Most approaches to measuring the input phase R in the presence of a sine modulation work with the harmonic series of the analog output given by:

$$V(t) = P_{dc} + P_{ac} J_o(M) \cos R$$

$$V(t) = P_{dc} + P_{ac} J_o(M) \cos R +$$
$$2 P_{ac} \cos R \sum_{k=1}^{\infty} J_{2k}(M) \cos(2kt + W_{2k}) -$$
$$2 P_{ac} \sin R \sum_{k=1}^{\infty} J_{2k-1}(M) \sin((2k-1)t + W_{2k-1})$$

The simplest and most limited open loop interferometric demodulation approach using PGC modulation is where the analog output is mixed with a reference signal equivalent to the frequency used to perform the modulation and lowpass filtered with a gain K to the bandwidth of the input phase R. The resulting analog output is:

$$V_1 = \{2K P_{ac} \cos(W_1) J_1(M)\} \cdot \sin R$$

which may be viewed as a scaling factor in the curly brackets multiplied by the sine of the input phase R. When R has an absolute value less than 0.2 radians, the small angle approximation of sin R=R is valid, resulting in a linear demodulated output over the range of ±0.2 radians. The terms that make up the scale factor in the brackets point out the possible demodulation errors, which this simple approach shares with many other methods. The scale factor will change with variations in the interferometer optical gain $P_{ac}$, the modulation depth M, the synchronous detection phase W and the filter gain K. In the real world applications, where thermal environments may vary by 100 degrees Celsius or more, it is not uncommon to find any one of these scaling terms to change by 10% or more.

Many of those familiar with the art are knowledgeable of these effects and can, through design processes, provide some mitigation of them. For example, two reference frequencies and two synchronous detection channels will add a quadrature output term as follows:

$$V_2 = \{2K P_{ac} \cos(W_2) J_2(M)\} \cdot \cos R$$

It is evident that, with quadrature measures of the phase, either analog or digital inverse trigonometric post processing may be utilized to determine R. The analog process will be limited in range to ±π/2 radians; where a digital approach can go much further. If the quadrature terms are digitized, it is possible to implement a processing algorithm such as that defined in U.S. Pat. No. 4,789,240 in a process flow detailed in this patent's FIG. 7 (starting at the third step) which provides for an extremely large dynamic range, which is limited only by the constraint that the rate of change of phase not exceed π radians per consecutive sample. This process initially determines R to within a quadrant or octant, and then using the polarity of the quadrature terms, determines R to within the unit circle, and then using previous sample phase information is able to use simple logic to track phase as it crosses fringe boundaries. This tracking capability is limited only to the bit length of the counter used to track fringe crossings. This design and others like it show promise for large dynamic ranges if implemented in a digital format, but its measurement performance still falls short in that it provides no means of correcting scaling error terms related to modulation depth control, synchronous detector phase errors, and cross channel processing gain variations.

It would be a great improvement to the art if the linear dynamic range of an open loop interferometric demodulator could be arbitrarily large (micro-radians to millions of radians or greater) while it implemented processes, which automatically control all critical scaling factors such that they are invariant. Additionally, such a demodulator should be able to work with many different types of two-beam interferometers, such as Sagnac, Mach-Zehnder, Michelson, Low Finesse Fabry Perot, and others, and be able to efficiently demodulate the multiplexed outputs of such sensors positioned in an array.

There are a number of open loop interferometric demodulation designs described or practiced in the art, which intend to overcome the described scaling errors as well as provide larger linear dynamic ranges. U.S. Pat. Nos. 4,704,032 and 4,756,620 describe approaches which provide active compensation for amplitude scaling, but do not compensate the other scaling errors and additionally provide dynamic ranges less than 1 radian. U.S. Pat. Nos. 4,637,722; 4,687,330; 4,707,136; 4,728,192; and 4,779,975 describe approaches and improvements which compensate for, or are immune to amplitude and phase errors. These implementations also extend dynamic range, but are limited to tens of radians or less. U.S. Pat. No. 5,202,747; 5,289,259; 5,355,216; and 5,438,411 describe approaches and improvements which are immune to amplitude variations and to some degree, modulation depth and gain scaling variations. However these approaches are still subject to phase errors caused by band limited operation of square-law detectors and their associated electronic amplifiers. Additionally, these approaches are limited in dynamic range to less than 100 radians. U.S. Pat. Nos. 4,765,739; 4,776,700; 4,836,676; 5,127,732; and 5,289,257, describe approaches which compensate for, or are immune to modulation depth and amplitude variations and are also capable of operating over large dynamic ranges. However these approaches are still subject to synchronous detection phase offsets and variations (changes in W) and additionally cross-channel gain scaling variations. U.S. Pat. Nos. 4,883,358 and 5,412,472 describe an approach which actively stabilizes field amplitude, modulation depth, and phase errors and is capable of operating over a large dynamic range. However, this approach is still subject to cross channel gain scaling variations.

Although a number of the above referenced design techniques approach the desired high accuracy and large dynamic range design objective, the ones which come the closest require complex electronic circuitry. It would also be a great improvement to the art if an interferometric demodulator having the desired high accuracy and large dynamic range was available, especially if it was simple in design and implementation, and low cost in manufacture. Such traits are inherent in the present invention.

SUMMARY OF THE INVENTION

In accordance with the invention, a method and demodulator apparatus is presented to measure the input phase in interferometer systems. The demodulator apparatus is used with phase generated carrier interferometers and includes: an analog to digital converter, which samples the analog output of the interferometer; a clock, which provides the sample and system timing; a digital signal processing apparatus; and a digital to analog converter followed by a lowpass filter, which synthesizes the desired interferometer sine modulation drive output, which creates the phase generated carrier.

Demodulation is accomplished by sampling the interferometer output signal such that quadrature components are extracted and through an inverse trigonometric process, the interferometric phase is measured. The preferred embodiment for the demodulator apparatus involves twelve equally spaced samples taken of the analog output of the interferometer during one modulation period to assure orthogonality (for precise quadrature signal extrication) plus a common interval sample just after the modulation period to assure that the center of the time for the samples is identical. It is recognized that fewer than twelve samples can be taken since some of the twelve samples are normally identical. With the advent of very fast integrated optic devices, which can be used to form the present apparatus, and the fact that most interferometric signals are the result of physical processes, which are relatively slow with respect to sample time, complete symmetry is not always required to assure proper demodulation.

The thirteen digital samples are processed during an expanded modulation cycle in a fast and simple manner to provide the wide dynamic range measurement of the input phase, and the optimum amplitude update of the sine modulation drive output (modulation depth servo), and the optimum phase update of the sine modulation drive output (modulation phase servo). The modulation depth and phase servos are employed to assure an accurate measurement of the input phase.

The dynamic range of the input phase measurement is extended to arbitrarily large values by tracking fringe crossings, which only require that the input phase change by less than π radians during the time of one modulation cycle, which is almost a given when high speed components and physical processes are involved.

Therefore, it is an object of the present invention to provide improved open loop demodulation apparatus with a large dynamic range, high accuracy, and low distortion that takes advantage of improved components so that the phase outputs of singular sensors or an array of sensors which can be separated and determined by a single demodulator.

Another object is to reduce the number of samples required to demodulate a phase shifting interferometer output while reducing distortion to a minimum.

Another object is to reduce the cost of apparatus to demodulate the output of multiple interferometers with high accuracy and low distortion.

Another object is to reduce the size and the number of components required to demodulate the outputs of interferometers with high accuracy and low distortion.

These and other objects and advantages of the present invention will become apparent to those skilled in the art after considering the following detailed specification, together with the accompanying drawings wherein:

BRIEF DESCRIPTION OF THE DRAWINGS

FIGS. 2A through 2I are graphs of computer generated wave forms showing how phase changes in the output of the interferometer of FIG. 1, as expressed by the formula $V(t)=P_{dc}+P_{ac}\cos\{R+M\sin(t+W)\}$, change its output wave form when $P_{ac}$, M, and W are constant;

FIG. 2J is a graph of a computer generated wave form showing how a change in $P_{ac}$ changes the output of the interferometer of FIG. 1;

FIG. 2J is a graph of a computer generated wave form showing how a change in M changes the output of the interferometer of FIG. 1;

FIG. 2L is a graph of a computer generated wave form showing how a change in W changes the output of the interferometer of FIG. 1;

FIG. 2M is a graph of a computer generated wave form showing how complex and consequently how difficult the output of the interferometer of FIG. 1 is to demodulate when $P_{ac}$, R, M, and W are all changing;

FIG. 3A is a graph of the even component of the nominal analog output of the interferometer of FIG. 1 in accordance with the invention, which is marked with sample points that are used to measure its amplitude;

FIG. 3B is a graph of the odd component of a nominal analog output of the interferometer of FIG. 1 which is marked with sample points that are used to measure its amplitude;

DETAILED DESCRIPTION OF THE PREFERRED EMBODIMENTS

Figure 1:
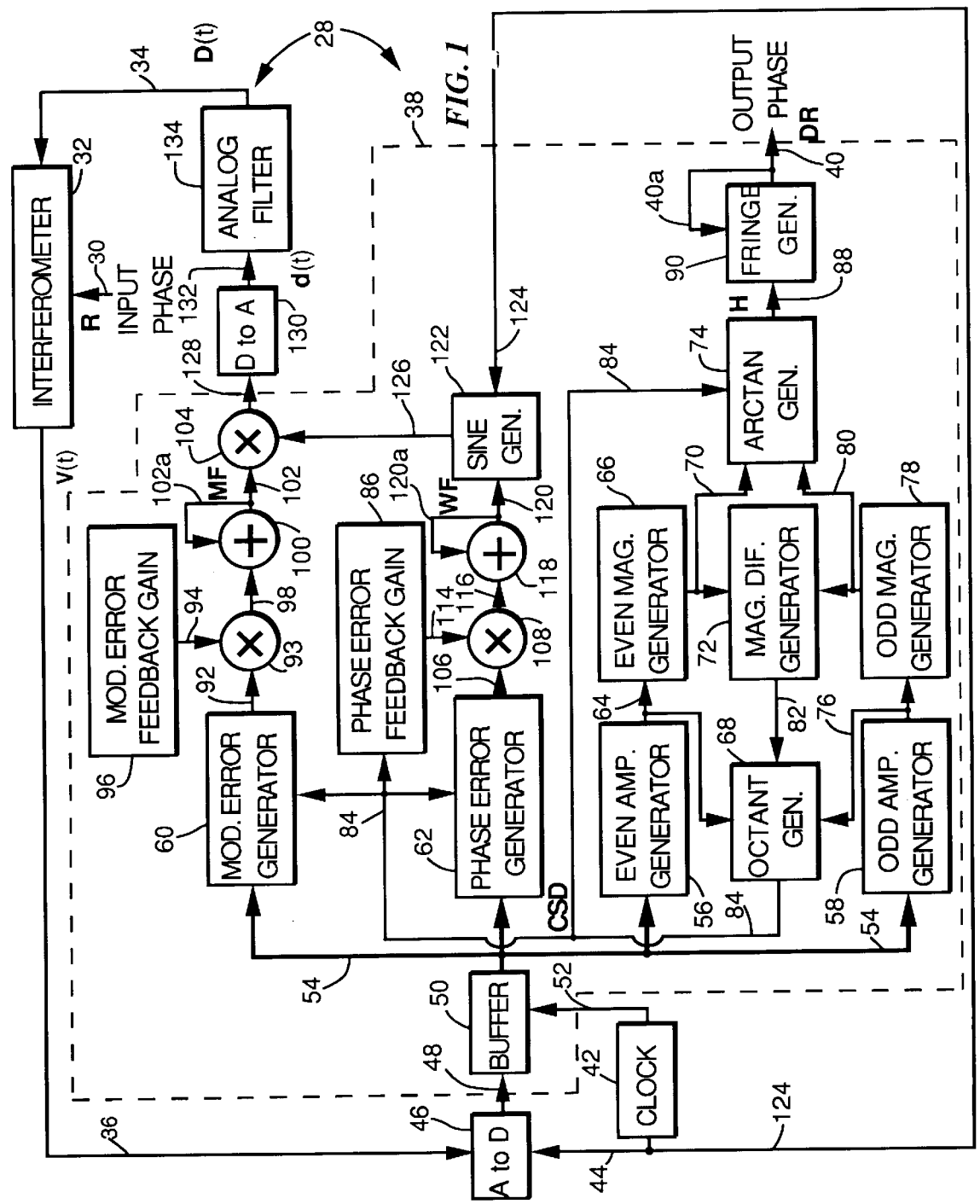
FIG. 1 is a schematic block diagram of an orthogonal demodulation and modulation apparatus in accordance with a preferred embodiment of the invention in conjunction with an interferometer.

FIG. 1 is a detailed block diagram of the present invention 28, which measures the absolute phase within $2\pi$ radians and the number of $2\pi$ radian variations since turn on, in an analog input phase signal 30 and converts such into a digital representation of the phase during each modulation cycle. The measurement is accomplished by inputting the phase signal 30 to an interferometer 32 where it is summed with D(t), a controlled sinusoidal feed back signal 34 to produce V(t), an analog output signal 36, which after being digitized, is processed in a digital signal processor 38 to produce: a varying digital output phase signal 40 that follows the variations of the input phase signal 30; and D(t), the controlled sinusoidal feed back signal 34.

The nature of interferometers, such as interferometer 32, is that they produce the analog output signal 36, expressed as:

$$V(t) = P_{dc} + P_{ac} \cos\{R + M \sin(t+W)\}$$

In this expression, $P_{dc}$ is a constant amplitude offset, $P_{ac}$ is the amplitude of the modulated output of the interferometer 32, R is the input phase in radians, M is a modulation depth of the interferometer 32 in radians, W is a phase of the modulation of the interferometer 32 in radians and t is time converted to units of radians. FIGS. 2A through 2I illustrate how V(t) changes as the input phase (R) signal 30 changes from 0 to $2\pi$ in $0.25\pi$ increments when $P_{dc}$, $P_{ac}$, M, and W are constant. In a well designed interferometer, $P_{dc}$ and $P_{ac}$ are equal, with any changes in $P_{ac}$ being changes that reduce its value. FIG. 2J illustrates how a reduction in $P_{ac\ below\ Pdc}$ reduces the peak to peak amplitude of V(t). FIG. 2K illustrates how an increase in the phase of the modulation W shifts V(t) to the left, FIG. 2L illustrates how an increase in the modulation depth M changes the modulation of V(t), and FIG. 2M illustrates how complex V(t) can become when $P_{ac}$, R, W, and M are all changing. This complexity has heretofore required expensive and complex demodulators to extract the phase R from the other possible variables.

The analog output V(t) results from the phase of the interferometer 32 being sine modulated by a linear transformation of output 34, which is provided by the processor 38. The sine modulation output 34 is proportional to the expression:

$$MF \cdot \sin(t+WF)$$

In this expression, MF is the feedback modulation depth output and WF is the feedback phase of the modulation output. The design of the interferometer 32 is such that M is proportional to MF and that W is equal to WF plus a radian offset. The output signal 36 is fed to the processor 38, which computes the output phase signal 40 from the input phase signal 30 as explained below.

The processor 38 automatically and continuously changes the values of the feedback modulation depth MF and the feedback phase of the modulation WF so as to keep the modulation depth M of the interferometer 32 very close to $\pi$ radians and the phase of the modulation W of the interferometer 32 at a value that maximizes the gain and minimizes the effects of noise on the output phase signal 40. There are many types of interferometers 32 that will transform a sine modulation D(t) and an input phase signal 30 into the analog output V(t) and the present invention is not limited to the use of one type.

A clock 42 controls the operation sequence of the invention 28. One output 44 from the clock 42 triggers an analog to digital converter (A to D) 46 to sample the interferometer analog output 36. The output 48 of the analog to digital converter 46 is a series of thirteen digital numbers, which digitally represents a cycle of the interferometer analog output 36 plus the first digital number of the next cycle. The series of numbers are transferred to a sample buffer 50 and stored. A modulation cycle output 52 from the clock 42 is the modulation cycle clock, at one twelfth the rate of the output 44. Twelve equally spaced samples during one modulation cycle are taken of the interferometer analog output 36, V(t) during one modulation cycle and a thirteenth sample equally spaced from the twelfth in the next modulation cycle is also taken and averaged with the first.

The mathematical identity:

$$\cos(a+b) = (\cos(a)\cdot\cos(b)) - (\sin(a)\cdot\sin(b))$$

can be applied to the analog output V(t) to give the expression:

$$V(t) = P_{dc} + P_{ac}\cos(R)\cdot\cos\{M\sin(t+W)\} - P_{ac}\sin(R)\cdot\sin\{M\sin(t+W)\}$$

By substituting an even modulation function E(t) and an odd modulation function O(t), which are defined as follows:

$$E(t) = \cos\{M\sin(t+W)\}$$

$$O(t) = \sin\{M\sin(t+W)\}$$

the analog output 36 of the interferometer 32 is expressed as:

$$V(t) = P_{dc} + P_{ac}\cos(R)\cdot E(t) - P_{ac}\sin(R)\cdot O(t)$$

The terms "even" and "odd" refer to the behavior of the modulation functions when the time is shifted by $\pi$ radians. The even function responds as follows:

$$E(t+\pi) = \cos\{M\sin(t+W+\pi)\} = \cos\{M\sin(t+W)\cdot\cos\pi + M\cos(t+W)\cdot\sin\pi\} = \cos\{-M\sin(t+W)\} = \cos\{M\sin(t+W)\} = E(t)$$

and is seen to reproduce itself in the second half of the $2\pi$ modulation cycle. The odd function responds as follows:

$$O(t+\pi) = \sin\{M\sin(t+W+\pi)\} = \sin\{M\sin(t+W)\cdot\cos\pi + M\cos(t+W)\cdot\sin\pi\} = \sin\{-M\sin(t+W)\} = -\sin\{M\sin(t+W)\} = -O(t)$$

and is inverted in the second half of the $2\pi$ modulation cycle. These even and odd properties are the basis of the orthogonal demodulation process, which is automated in the processor 38, because the modulation functions E(t) and O(t) form an orthogonal pair with respect to sample time shifts of $\pi$ so that one can be measured while the other is rejected. However, to reduce distortion to a minimum, the even and odd function must be based on samples taken during the same average time period, hense the reason for taking the thirteenth sample and averaging it with the first.

Consider the addition of two samples of the analog output separated by a radian time $\pi$ as shown below:

$$V(t+\pi) + V(t) = P_{dc} + P_{ac}\cos(R)\cdot E(t) + P_{ac}\sin(R)\cdot O(t) + P_{dc} + P_{ac}\cos(R)\cdot E(t) - P_{ac}\sin(R)\cdot O(t) = 2P_{dc} + 2P_{ac}\cos(R)\cdot E(t)$$

The sum contains the amplitude of the even modulation function E(t) while completely suppressing the odd modulation function O(t). Now consider the subtraction of two samples of the analog output separated by a radian time π as shown below:

$$V(t+\pi)-V(t)=P_{dc}+P_{ac}\cos(R)\cdot E(t)+P_{ac}\sin(R)\cdot O(t)-P_{dc}-P_{ac}\cos(R)\cdot E(t)+P_{ac}\sin(R)\cdot O(t)=2P_{ac}\sin(R)\cdot O(t)$$

This difference contains the amplitude of the odd modulation function O(t) while completely suppressing the even modulation function E(t).

As aforesaid, the occurrence of the modulation cycle output 52 causes the twelve samples in the sample buffer 50 to be transferred through a sample buffer output 54, which transfers the samples to an even component amplitude generator 56, and an odd component amplitude generator 58, as well as a modulation depth error generator 60, and a sample phase error generator 62, which will be discussed later. The samples will be denoted in order by S0, S1, S2, S3, S4, S5, S6, S7, S8, S9, S10, S11, and S12 hereinafter.

The even component amplitude generator 56 forms a number CR from a linear combination of four of the twelve samples buffered during the previous modulation cycle. This number from output 64 is proportional to the cosine of the input phase 30. The number CR is given by the following expression:

$$CR=(S0+S12)/2-S3+S6-S9$$

with (S0+S12)/2, S3, S6, and S9 being the locations of the minimum and maximum points of the nominal even component as shown in FIG. 3A. The (S0+S12)/2 term causes the even component amplitude to be determined at the same average time as the odd component amplitude (note how the samples S0, S3, S6, S9, and S12 are equally spaced about the time 6). In most slow changing signals, S12 and S0 are essentially identical. However in fast changing signals, S12 and S0 may have an appreciable difference that otherwise can introduce distortion into the system 28. The number from output 64 is transferred to an even component magnitude generator 66 and an octant generator 68. The number from output 70 of the even component magnitude generator 66 is the absolute value of the number from input 64. The number from output 70 is proportional to the absolute value of the cosine of the interferometer input phase 30. The number from output 70 is transferred to a magnitude difference generator 72 and an inverse tangent (arctan) generator 74.

The odd component amplitude generator 58 forms a number SR from a linear combination of four of the twelve samples buffered during the last modulation cycle. This number from output 76 is proportional to the sine of the input phase 30. The number SR is given by the following expression:

$$SR=S7+S11-S5-S1$$

with S1, S5, S7, and S11 being the locations of the minimum and maximum points of the nominal odd component as shown in FIG. 3B (note how the samples S1, S5, S7, and S11 are equally spaced about the time 6). This number, SR, from output 76 is transferred to the odd component magnitude generator 78 and the octant generator 68. The number from output 80 of the odd component magnitude generator 78 is the absolute value of the number from input 76. The number from output 80 is proportional to the absolute value of the sine of the interferometer input phase 30. The number from output 80 is transferred to the magnitude difference generator 72 and the inverse tangent generator 74.

The magnitude difference generator 72 subtracts the magnitude of the odd component from output 80 from the magnitude of the even component from output 70. The sign of this number from output 82 determines which octant within a quadrant contains the resultant vector of the modulation components. The number from output 82 is transferred to the octant generator 68.

The output 84 from the octant generator 68 is a number having a value of 0, 1, 2, 3, 4, 5, 6 or 7. This number is formed using the three sign bits of the numbers from output 64, output 76 and output 82 (conventionally 0=+, 1=−).

The calculation that measures the even modulation function also measures the DC term $P_{dc}$. This undesirable property can be removed and the gain doubled by subtracting a second sum taken at a different time radian T as shown below:

$$\{V(t+\pi)+V(t)\}-\{V(T+\pi)+V(T)\}=2P_{ac}\cos(R)\cdot\{E(t)-E(T)\}$$

The gain can also be doubled for the odd function as shown in the expression below:

$$\{V(t+\pi)-V(t)\}+\{V(T+\pi)-V(T)\}=2P_{ac}\sin(R)\cdot\{O(t)+O(T)\}$$

Figure 3C:
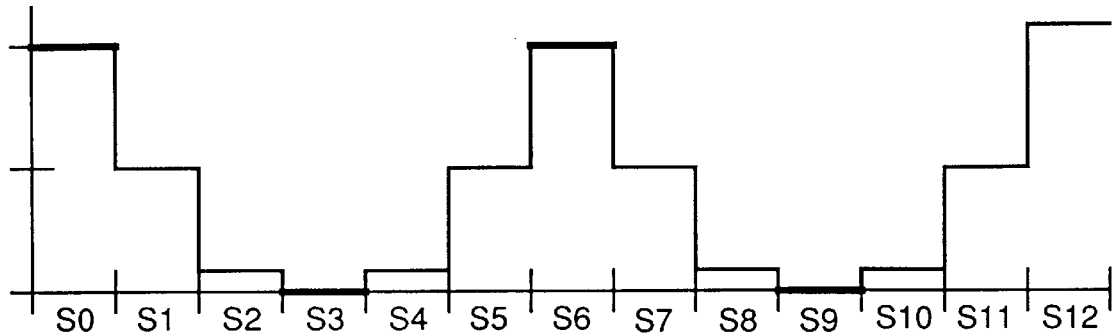
FIG. 3C is a graph of the even component shown in FIG. 3A after it has been digitized with the samples indicated by wide lines.

These measures, which are proportional to the cosine and the sine of the input phase R, were derived independent of the values of the modulation depth of the interferometer M and the phase of the modulation of the interferometer W and so are completely independent of these parameters. However, a good demodulator should maximize the gain and minimize the operating errors whenever possible. FIG. 3A is a graph of the even modulation function E(t) with M equal to π and W equal to zero on a scale where there are thirteen samples with π/6 radians between samples. The even modulation function E(t) is shown in digitized form in FIG. 3C. The horizontal axis is labeled in integer multiples of π/6 radians. This graph suggests the following measure for the even modulation function in terms of the π/6 samples S:

$$CR=\{S6+(S0+S12)/2\}-(S9+S3)=2P_{ac}\cos(R)\cdot\{E(3\pi/6)\}$$

Figure 3D:
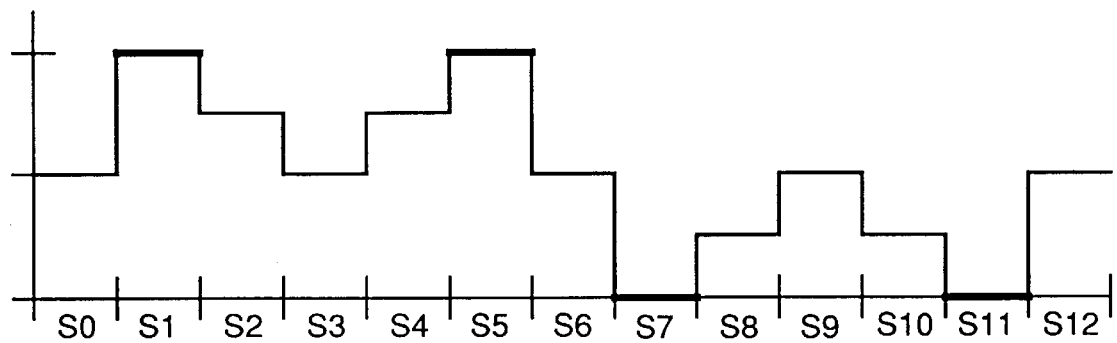
FIG. 3D is a graph of the odd component shown in FIG. 3B after it has been digitized with the samples indicated by wide lines.

FIG. 3B is a graph of the odd modulation function O(t) in the same manner, O(t) being shown in digitized form in FIG. 3D, and suggests the following measure of its amplitude:

$$SR=(S7-S1)+(S11-S5)=2P_{ac}\sin(R)\cdot\{O(\pi/6)+O(5\pi/6)\}$$

The independent measurement of CR and of SR does not depend upon the values of M or W, but they will have maximum and equal gains and minimum sensitivity to variation in these two parameters when M is equal to π and W is equal to zero where:

$$CR=(S6+(S0+S12)/2)-(S9+S3)=4P_{ac}\cos(R)$$

$$SR=(S7-S1)+(S11-S5)=4P_{ac}\sin(R)$$

Figure 3E:
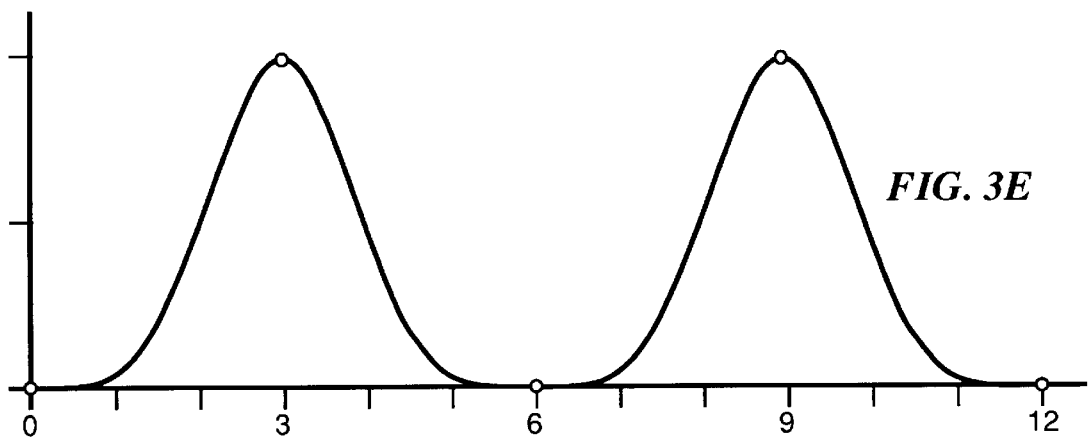
FIG. 3E is a graph of the even component of the nominal analog output of the interferometer of FIG. 1 in accordance with the invention, which is marked with sample points that are used to measure its amplitude except the sample period has been shifted by 3 so that the samples are symmetrical over the sampling period, so that errors that could be introduced by linear changes in the optical power $P_{ac}$ are completely rejected.
Figure 3F:
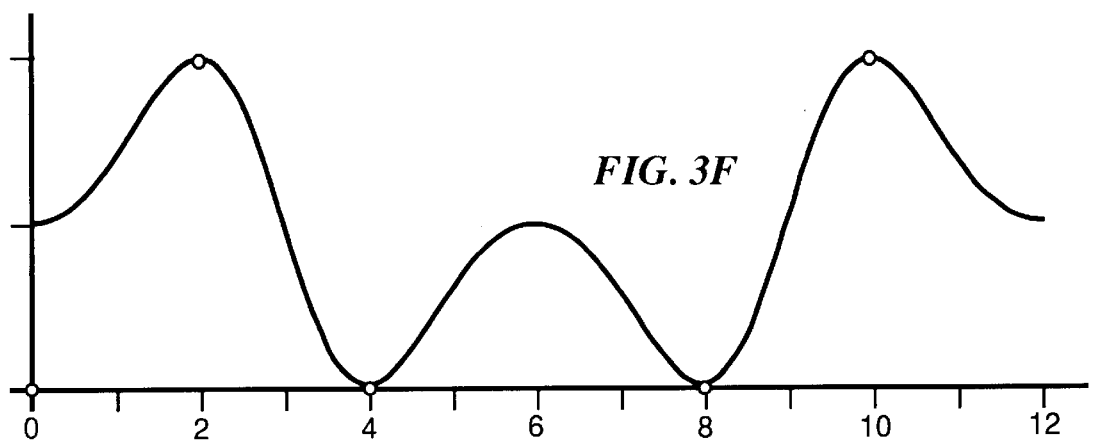
FIG. 3F is a graph of the odd component of the sample period of FIG. 3E.

FIGS. 3E and 3F are graphs of the even and odd components of the nominal analog output of the interferometer of FIG. 1 in accordance with the invention, except the sample period has been shifted by 3 so that the samples are symmetrical over the sampling period. This causes errors that could be introduced by linear changes in the optical power $P_{ac}$ to be completely rejected. The resulting even and odd equations are:

$$CR=(S3+S9)-((S0+S12)/2+S6)=4P_{ac}\cos(R)$$

$$SR=(S8-S2)+(S4-S10)=4\,P_{ac}\sin(R)$$

Figure 3G:
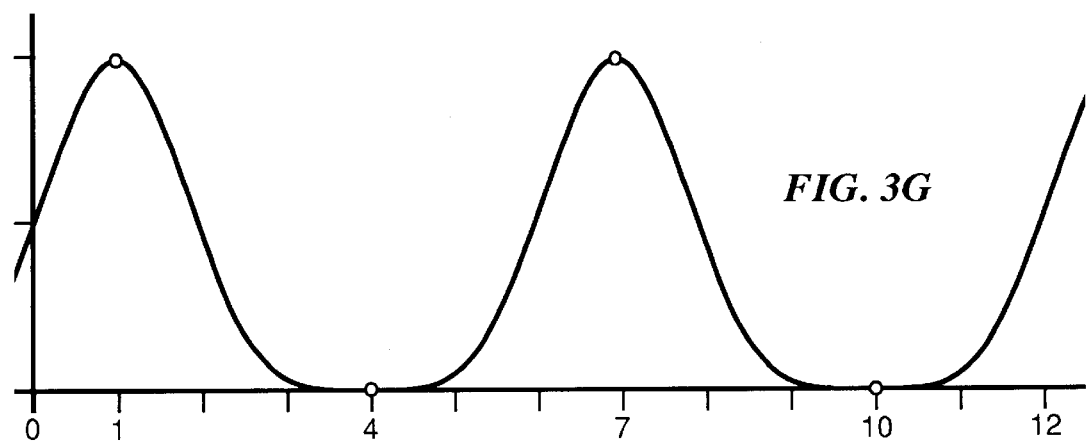
FIG. 3G is a graph of the even component of the nominal analog output of the interferometer of FIG. 1 in accordance with the invention, which is marked with sample points that are used to measure its amplitude except that the mean time of the odd function is balanced at time 5.5 which rejects some, but not all of linear power changes, and therefore in most cases is not as desirable as that shown in FIGS. 3E and 3F.
Figure 3H:
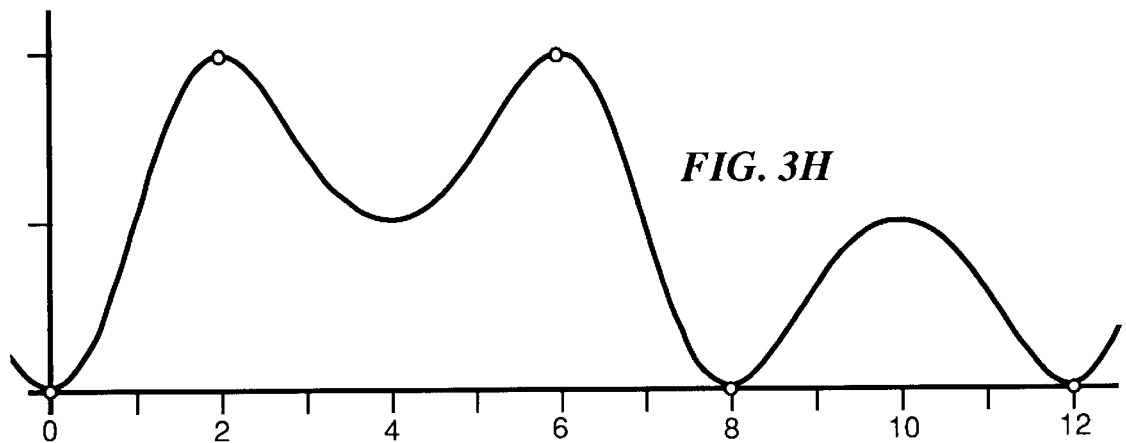
FIG. 3H is a graph of the odd component of the sample period of FIG. 3G.

FIGS. 3G and 3H are graphs of the even and odd components of the nominal analog output of the interferometer of FIG. 1 in accordance with the invention, except that the mean time of the odd function is balanced at time 5.5 which rejects some, but not all of linear power changes, and therefore in most cases is not as desirable as that shown in FIGS. 3E and 3F. The resulting even and odd equations are:

$$CR=(S1+S7)-(S4+S10)=4P_{ac} \cos(R)$$

$$SR=(S8-S2)+((S0+S12)/2-S6)=4P_{ac} \sin(R)$$

Figure 3I:
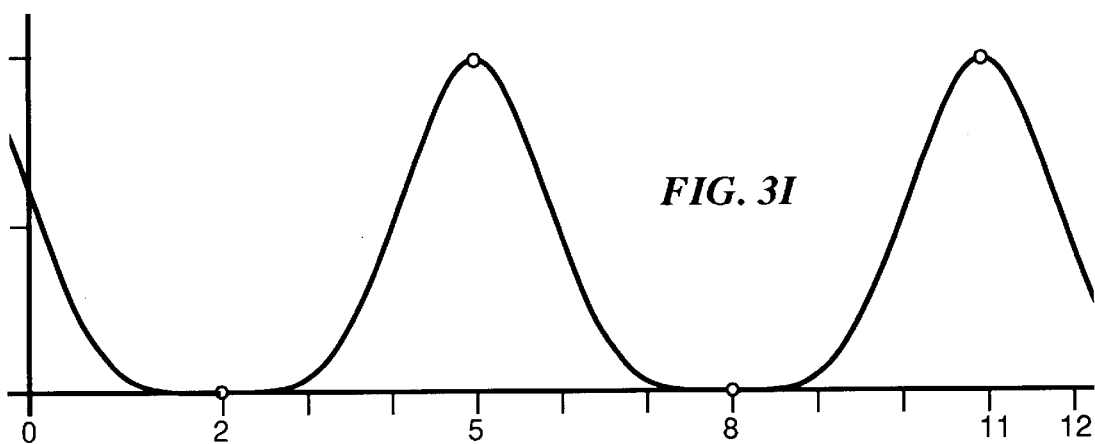
FIG. 3I is a graph of the even component of the nominal analog output of the interferometer of FIG. 1 in accordance with the invention, which is marked with sample points that are used to measure its amplitude except that the mean time of the odd function is balanced at time 6.5, which rejects none of the linear power changes unlike that shown in FIGS. 3E, 3F, 3G, and 3H.
Figure 3J:
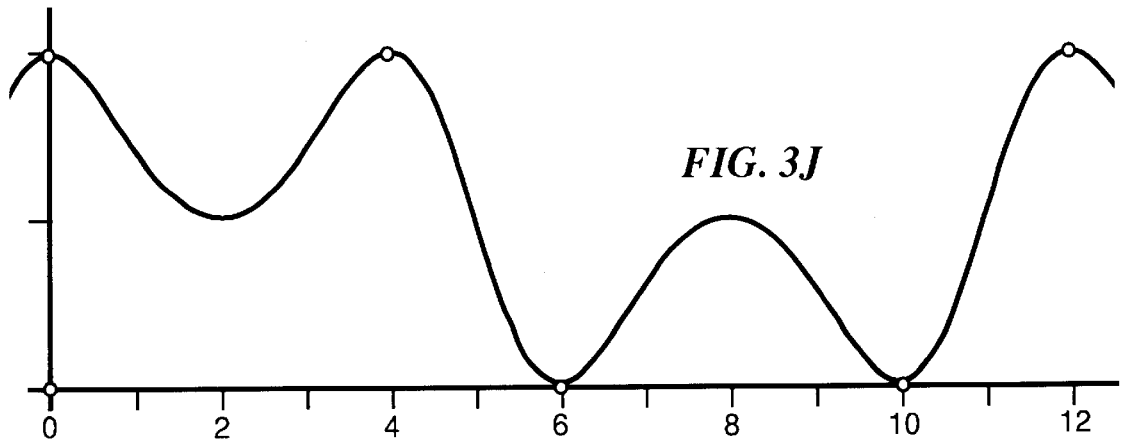
FIG. 3J is a graph of the odd component of the sample period of FIG. 3I.

FIG. 3H is a graph of the odd component of the sample period of FIG. 3G;

FIGS. 3I and 3J are graphs of the even and odd components of the nominal analog output of the interferometer of FIG. 1 in accordance with the invention, except that the mean time of the odd function is balanced at time 6.5 which rejects none of the linear power changes unlike that shown in FIGS. 3E, 3F, 3G, and 3H. The resulting even and odd equations are:

$$CR=(S5+S11)-(S2+S8)=4P_{ac} \cos(R)$$

$$SR=(S6-((S0+S1)/2)+(S10-S4)=4P_{ac} \sin(R)$$

Figure 4A:
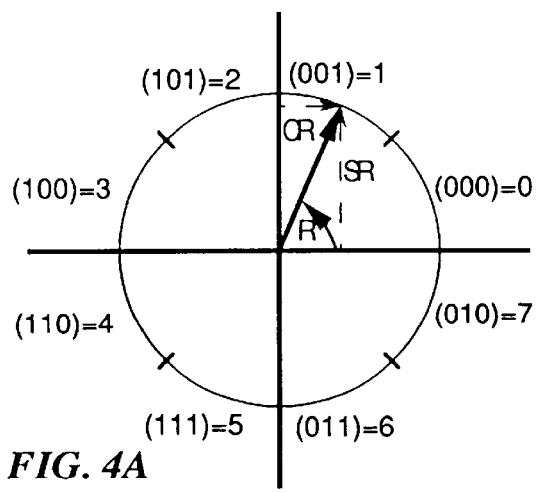
FIG. 4A is a diagram of the vector at the phase R, its orthogonal components CR and SR, and the octant in which the vector is located.

The goal of the demodulator 28 is to measure the input phase R. This can be done by noting that the line from the origin to the point (CR, SR) in the Cartesian plane is at an angle R from the x axis (FIG. 4A). The octant containing this demodulation vector can be identified by first finding the quadrant through the signs of its components CR and SR and then finding the octant within that quadrant by the sign of the difference D=X−Y of their absolute values X and Y respectively. These three sign bits form an index CSD, which has a value of from 0 to 7, which is mapped to the octant number by the following table:

| sign of CR | sign of SR | sign of D | CSD | octant |
|---|---|---|---|---|
| 0 | 0 | 0 | 0 | 0 |
| 0 | 0 | 1 | 1 | 1 |
| 1 | 0 | 1 | 5 | 2 |
| 1 | 0 | 0 | 4 | 3 |
| 1 | 1 | 0 | 6 | 4 |
| 1 | 1 | 1 | 7 | 5 |
| 0 | 1 | 1 | 3 | 6 |
| 0 | 1 | 0 | 2 | 7 |

The number CSD from output 84 identifies the octant containing the resultant vector whose components are the even component amplitude vector CR and the odd component amplitude vector SR. The number from output 84 is transferred to the modulation depth error generator 60, the sample phase error generator 62, the inverse tangent generator 74, and a sample phase error feedback gain 82.

By identifying the octant containing the demodulation vector, the input phase can be found by computing the inverse tangent or cotangent of the magnitude components X and Y in the first octant where the output range is restricted from 0 to $\pi/4$ radians.

The inverse tangent generator 74 computes the output phase number, which measures the input phase signal 30 module $2\pi$ radians. This number is a component of output 40. It is formed by computing the inverse tangent of the positive magnitude components X, which is the number from output 70, and Y, which is the number from output 80, and adding an offset phase as determined by the octant number. The substitution A TAN(X/Y)=A COT(Y/X) can be made at will depending on the needs of the processor hardware. The computation for each octant number is given below.

0 A TAN(Y/X)
1 $\pi/2$−A TAN(X/Y)
2 $\pi/2$+A TAN(X/Y)
3 $\pi$−A TAN(Y/X)
4 $\pi$+A TAN(Y/X)
5 $3\pi/2$−A TAN(X/Y)
6 $3\pi/2$+A TAN(X/Y)
7 $2\pi$−A TAN(Y/X)

The domain of the inverse tangent computation is the first octant between 0 radians $\pi/4$ radians. The domain is further restricted to the first half octant between 0 radians and $\pi/8$ radians by the following mathematical procedure, which finds the replacement value of A TAN(b/a):

IF $\{b-a(\sqrt{2}-1) \leq 0$ THEN A TAN(b/a)
ELSE $(\pi/4)$−A TAN$\{(a-b)/(a+b)\}$ The inverse tangent in the first half octant can be precisely evaluated by the approximate Taylor series:

$$ATAN(Z) \approx Z - Z\left\{Z^2\left(\frac{1}{3} - Z^2\left(\frac{1}{5} - Z^2\left(\frac{1}{7} - Z^2\left(\frac{1}{9} - \frac{Z^2}{11}\right)\right)\right)\right)\right\}$$

Once this has been accomplished in the arctan generator 74, the number, H from output 88 thereof is transferred to a fringe generator 90. The fringe generator 90 adds the updated fringe, which is an integer multiple of $2\pi$, to the output phase number H. The resulting number DR, which is the demodulated output phase signal 40, is formed from the demodulated output phase 40(a) of the previous modulation cycle and the current output phase 40 by tracking fringe crossings. A fringe is crossed when the current output phase 40 changes by more that $\pi$ radians from the previous output phase, which is contained in the $2\pi$ fraction of the demodulated output phase number 40. When the current output phase has increased more than $\pi$ radians from the previous output phase, the demodulated output phase 40 is decremented by $2\pi$ radians. When the current output phase 40 has decreased more than $\pi$ radians from the previous output phase, the demodulated output phase 40 is incremented by $2\pi$ radians. Fringe crossings are properly detected so long as the input phase 30 changes less than $\pi$ radians during a modulation cycle. This restriction limits the upper phase change rate response, but if a particular application is likely to approach the response limit, then higher speed components and clock timing is used.

Figure 4B:
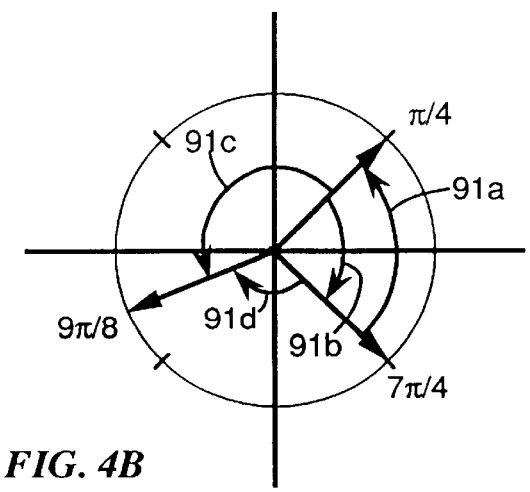
FIG. 4B is a diagram showing how a fringe crossing is determined from changes in the phase R of the vector of FIG. 4A.

FIG. 4B illustrates why the fringe crossings can be counted in this manner. In FIG. 4B, vectors are shown at $\pi/4$, $9\pi/8$, and $7\pi/4$. If, as shown by arrow 91a, the output changes from $7\pi/4$ to $\pi/4$, the output decreases $3\pi/2$ (more than $\pi$) and the fringe generator 90 is incremented. If, as shown by arrow 91b, the output changes from $\pi/4$ to $7\pi/4$, the output increases $3\pi/2$ (more than $\pi$) and the fringe generator 90 is decremented. When the vector changes less than $\pi$, as shown by arrow 91c from $\pi/4$ to $9\pi/8$ ($7\pi/8$) or by arrow 91d from $7\pi/4$ to $9\pi/8$ ($5\pi/8$), the previous fringe number is retained.

The inverse tangent can be used to find the output phase modulo $2\pi$ from the magnitude components X and Y when their gains are equal. That is when X=4 $P_{ac}|\cos(R)|$ and Y=4 $P_{ac}|\sin(R)|$, their equal gains of 4 $P_{ac}$ makes their ratio:

$$\frac{Y}{X} = \frac{|\sin R|}{|\cos R|} = TAN(R)$$

The condition of equal gains will not hold for every value of the modulation depth of the interferometer M and the phase of the modulation of the interferometer W. For this reason and to optimize the performance of the demodulator, M should be held at a value of π radians and W should be maintained at a value of zero.

Consider the four measures below formed from combinations of the thirteen samples:

$$CM=(S7+S1)-\{S6+(S0+S12)/2\}+(S11+S5)-(S9+S3)$$

$$SM=(S9-S3)$$

$$CW=(S7+S1)-(S11+S5)$$

$$SW=-\{S6-(S0+S12)/2\}$$

These measures are all combinations of sums or differences of samples separated by π radians and therefore have the orthogonal property with respect to the even and odd modulation components E(t) and O(t). The measure CM rejects O(t) and measures E(t) and is called the even modulation depth error. The measure CW rejects O(t) and measures E(t) and is called the even phase error. The measure SM rejects E(t) and measures O(t) and is called the odd modulation depth error. The measure SW rejects E(t) and measures O(t) and is called the odd phase error.

Figure 5:
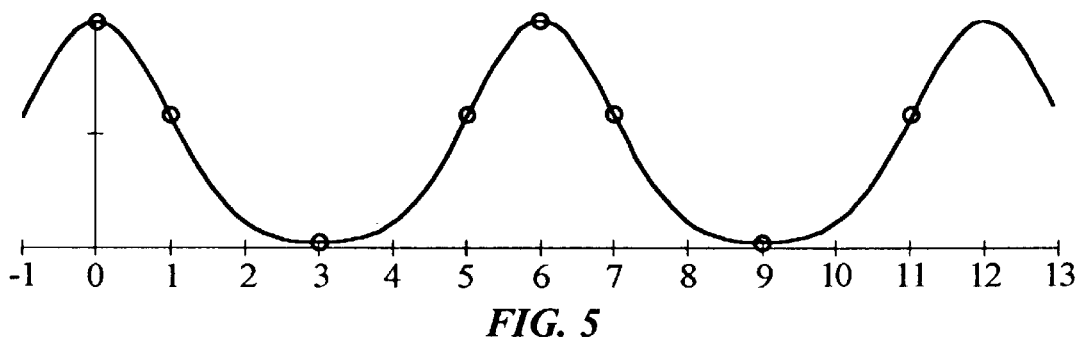
FIG. 5 is a graph of the even component of the analog output of the interferometer of FIG. 1 having a modulation depth of $9\pi/10$ radians, which is marked with sample points that are used to measure the modulation depth deviation from $\pi$ radians.
Figure 6:
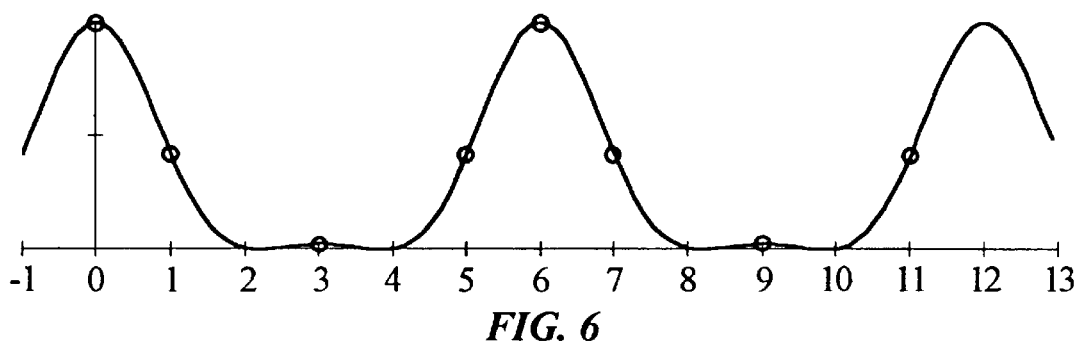
FIG. 6 is a graph of the even component of the analog output of the interferometer of FIG. 1 having a modulation depth of $11\pi/10$ radians, which is marked with sample points that are used to measure the modulation depth deviation from $\pi$ radians.
Figure 7:
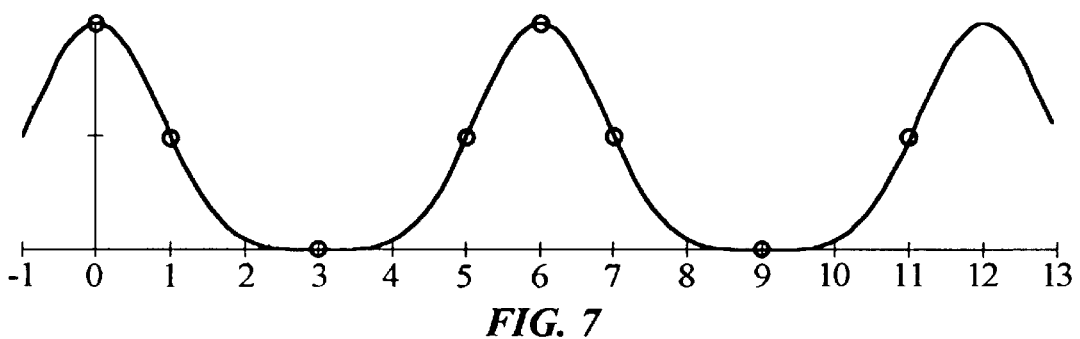
FIG. 7 is a graph of the even component of the analog output of the interferometer of FIG. 1 having a modulation depth of $\pi$ radians, which is marked with sample points that are used to measure the modulation depth deviation from $\pi$ radians.
Figure 8:
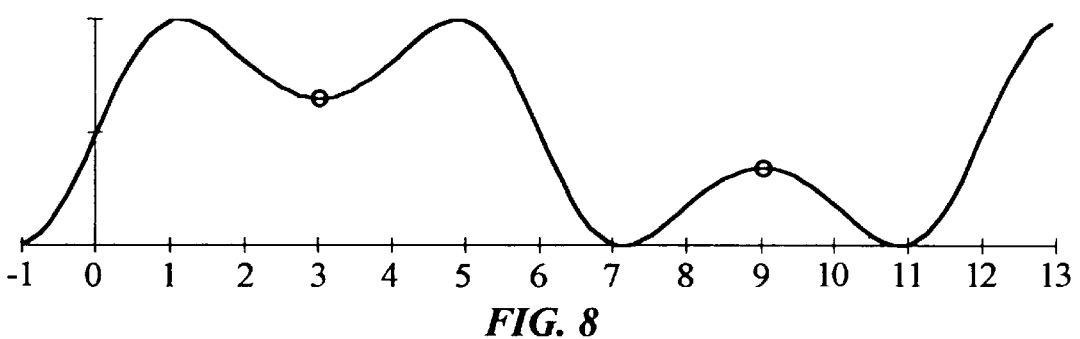
FIG. 8 is a graph of the odd component of the analog output of the interferometer of FIG. 1 having a modulation depth of $9\pi/10$ radians, which is marked with sample points that are used to measure the modulation depth deviation from $\pi$ radians.
Figure 9:
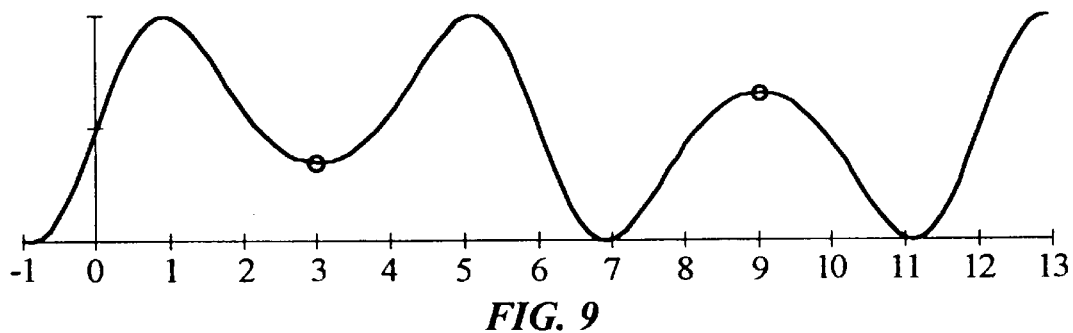
FIG. 9 is a graph of the odd component of the analog output of the interferometer of FIG. 1 having a modulation depth of $11\pi/10$ radians, which is marked with sample points that are used to measure the modulation depth deviation from $\pi$ radians.
Figure 10:
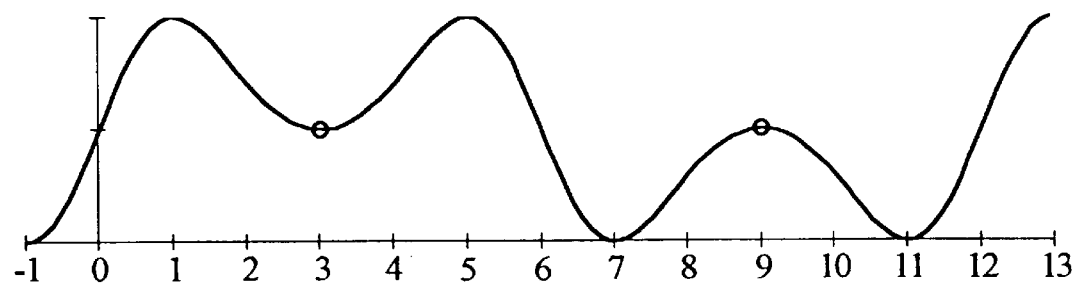
FIG. 10 is a graph of the odd component of the analog output of the interferometer of FIG. 1 having a modulation depth of $\pi$ radians, which is marked with sample points that are used to measure the modulation depth deviation from $\pi$ radians.

FIG. 5 shows the samples of CM on the even modulation function E(t), which has a modulation depth M of 0.9π and a phase W of zero. The graph shows that the difference of the sample sums, (S7+S1)−{S6+(S0+S12)/2} measures the distance from the middle level to the maximum of E(t) and the difference of the sample sums, (S11+S5)−(S9+S3) measures the distance from the middle level to the minimum of E(t). The resulting value of CM clearly will be positive. FIG. 6 shows the samples of CM on the even modulation function E(t), which has a modulation depth M of 1.1π and a phase W of zero. The value of CM in this case clearly will be negative. FIG. 7 shows the samples of CM on E(t) where M is π radians and W is zero and it is clear that CM is now zero. The measure CM thus forms a modulation depth error using the even modulation function with a null operating point when M is π radians. The same demonstration is done with SM using the odd modulation function O(t) in FIG. 8 where M is 0.9π, in FIG. 9 where M is 1.1π, and FIG. 10 where M is π radians. SM is seen to form a modulation depth error using the odd modulation function with a null operating point when M is π radians.

Figure 11:
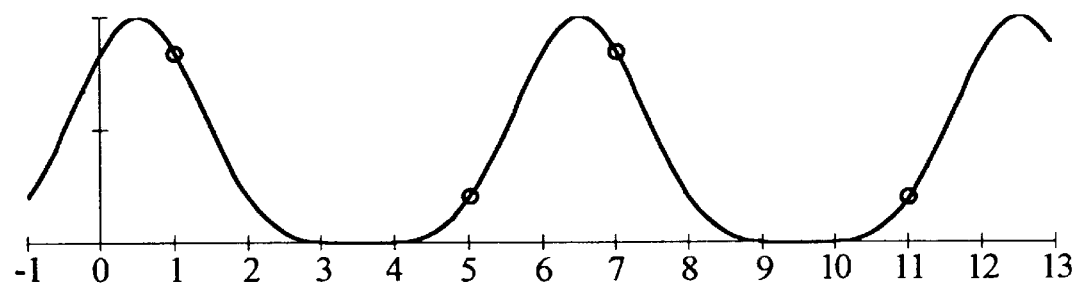
FIG. 11 is a graph of the even component of the analog output of the interferometer of FIG. 1 having a sampling phase of minus $\pi/12$ radians, which is marked with sample points that are used to measure the sampling phase deviation from 0 radians.
Figure 12:
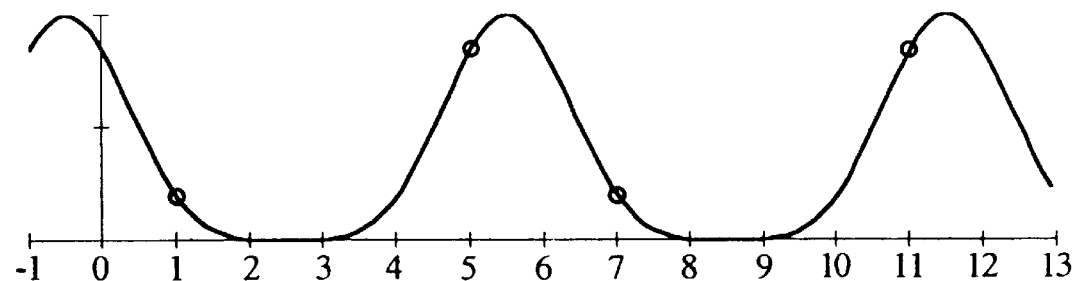
FIG. 12 is a graph of the even component of the analog output of the interferometer of FIG. 1 having a sampling phase of $\pi/12$ radians, which is marked with sample points that are used to measure the sampling phase deviation from 0 radians.
Figure 13:
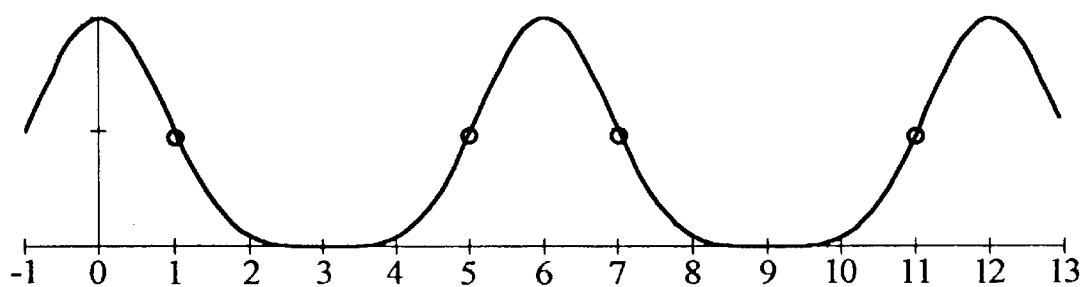
FIG. 13 is a graph of the even component of the analog output of the interferometer of FIG. 1 having a sampling phase of 0 radians, which is marked with sample points that are used to measure the sampling phase deviation from 0 degrees.
Figure 14:
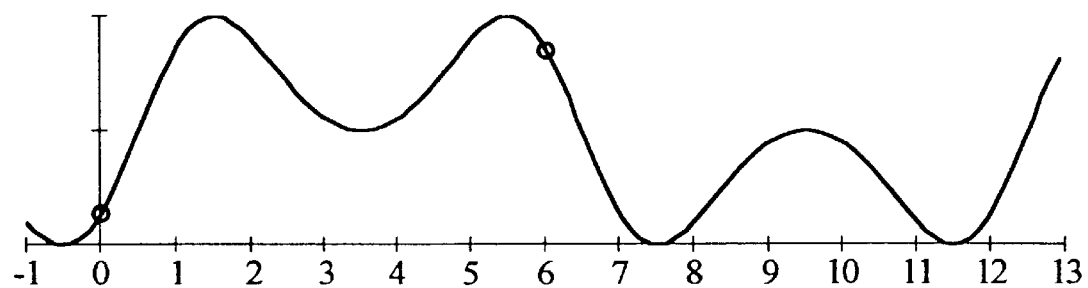
FIG. 14 is a graph of the odd component of the analog output of the interferometer of FIG. 1 having a sampling phase of minus $\pi/12$ radians, which is marked with sample points that are used to measure the sampling phase deviation from 0 radians.
Figure 15:
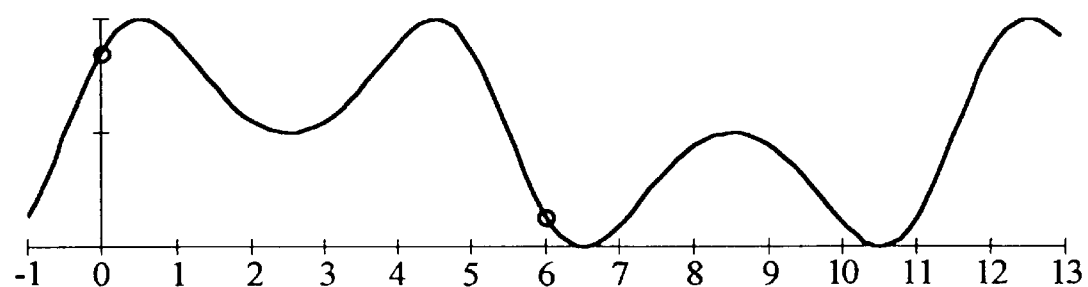
FIG. 15 is a graph of the odd component of the analog output of the interferometer of FIG. 1 having a sampling phase of $\pi/12$ radians, which is marked with sample points that are used to measure the sampling phase deviation from 0 radians.
Figure 16:
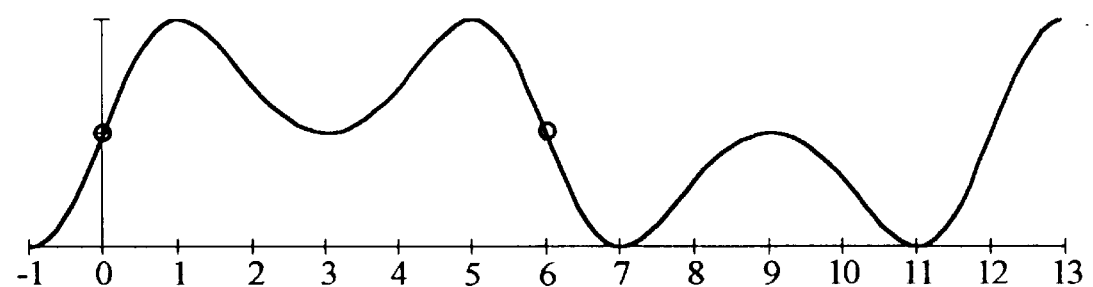
FIG. 16 is a graph of the odd component of the analog output of the interferometer of FIG. 1 having a sampling phase of 0 radians, which is marked with sample points that are used to measure the sampling phase deviation from 0 radians.

FIG. 11 shows the samples of CW on the even modulation function E(t), which has a modulation depth M of π and a phase W of −π/12 radians. The graph shows that (S7+S1)−{S6+(S0+S12)/2} measures a positive number. FIG. 12 shows the samples of CW on the even modulation function E(t), which has a modulation depth M of π and a phase W of π/12 radians. The value of CW in this case is clearly negative. FIG. 13 shows the samples of CW on E(t) where M is π radians and W is zero, and it is clear that CW is now zero. The measure CW thus forms a sample phase error using the even modulation function with a null operating point when W is 0 radians. The same demonstration is done with SW using the odd modulation function O(t) in FIG. 14 where W is −π/12, in FIG. 15 where W is π/12 radians, and FIG. 16 where W is 0 radians. SW is seen to form a sample phase error using the odd modulation function with a null operating point when W is 0 radians.

Therefore the modulation depth error generator 60 forms a number EM from a linear combination of the thirteen samples in the buffer 50 during the last modulation cycle. This number from output 92 is proportional to the deviation of the interferometer modulation depth M from π radians. The computation of EM depends upon the octant number from output 84 as shown below.

0 EM=−(S0+S12)/2+S1−S3+S5−S6+S7−S9+S11
1 EM=−S3+S9
2 EM=−S3+S9
3 EM=(S0+S12)/2−S1+S3−S5+S6−S7+S9−S11
4 EM=(S0+S12)/2−S1+S3−S5+S6−S7+S9−S11
5 EM=S3−S9
6 EM=S3−S9
7 EM=−(S0+S12)/2+S1−S3+S5−S6+S7−S9+S11

The number from output 92 is transferred to the input of a multiplier 93. A constant number from output 94 of a modulation depth error feedback gain 96 determines the time constant of the correction to the feedback modulation depth MF 102. The multiplier 93 forms the product of the modulation depth error output 92 and the modulation depth error feedback gain output 94. This product from output 98 is transferred to an adder 100. The adder 100 constitutes an integral servo that takes as input the feedback modulation depth 102a from the previous modulation cycle and adds it to the scaled modulation depth error output 98. The new feedback modulation depth output 102 is transferred to another multiplier 104.

The gains of the modulation depth and sample phase error measures can be found by using the orthogonal conditions and evaluating the sums near the null operating point where M is nearly π radians and W is near zero. The results are shown below:

$$CM=2P_{ac}(\pi-M)\cos(R)$$

$$SM=2P_{ac}(\pi-M)\sin(R)$$

$$CW=4P_{ac}cMW\cos(R)$$

$$SW=2P_{ac}MW\sin(R)$$

The constant (c) in the expression for CW is equal to $\sqrt{3}/2$. The gains of all the measures depend upon the sine or cosine of the input phase R. As a result, the gain of an error number can fade away and also change sign as the input phase R travels around the unit circle. These problems can be solved by using only the dominant error in the current octant with the proper sign change. The gains will at most be reduced by $\cos(\pi/4)$ or 0.71. The error terms for the sample phase W also have different gains by a factor of 1.73. This adjustment can be made to the feedback gain so that the average contributions from the even and odd sample phase errors are the same. The error term EM for the modulation depth, the error term EW for the sample phase and the sample phase feedback gain constant GW for each octant are shown below.

0 EM=CM EW=CW GW=GCW
1 EM=SM EW=SW GW=GSW
2 EM=SM EW=SW GW=GSW
3 EM=−CM EW=−CW GW=GCW
4 EM=−CM EW=−CW GW=GCW
5 EM=−SM EW=−SW GW=GSW
6 EM=−SM EW=−SW GW=GSW
7 EM=CM EW=CW GW=GCW

The average values of the errors EM and EW will be zero when the modulation sine supplied by the invention has the correct amplitude MF and phase WF. The correct values can be maintained under operation by forming null seeking integral servos, which are updated every modulation cycle time TC as follows:

$$MF=MF+GM \cdot EM$$

$$WF=WF+GW \cdot EW$$

The time constants of these two servos will depend upon the values of the feedback gains GM and GW multiplied by the gains of EM and EW. The feedback gains should be set to provide sufficient averaging of the noise and good response to changes in the modulation depth of the interferometer M and sample phase of the interferometer W. The feedback gains for the even and odd functions in terms of the modulation depth time constant TM and the sample phase time constant TW where both are in modulation cycles are:

$$GCM=1/(2P_{ac}TM|\cos R|)$$

$$GCW=1/(2\pi P_{ac}TW|\cos R|)$$

$$GSM=1/(2P_{ac}TM|\sin R|)$$

$$GSW=1/(2\pi P_{ac}TW|\sin R|)$$

The dependance upon the input phase R can be removed by choosing the maximum time constant in the octant of operation where cos R=sin R=1 giving:

$$GM=GCM=GSM=1/(2P_{ac}TM)$$

$$GSW=1/(2\pi P_{ac}TW)$$

$$GCW=GSW/2c$$

The initial values of MF and WF must be chosen to insure proper convergence to the optimum operating values. Fortunately, the sampling phase is generally insensitive to environment so does not change appreciably from turn on to turn on and can recover from an initial error of $\pm\pi/12$ radians. The initial modulation depth can change from turn on to turn on in many applications but the servo can recover from a large initial error.

The sample phase error generator 62 forms a number EW from a linear combination of the twelve samples in the buffer 50 during the last modulation cycle. This number from output 106 is proportional to the deviation of the sample phase W of the interferometer 32 from the optimum operating point. The computation of EW depends upon the octant output 84 as shown below.

0  EW=S1−S5+S7−S11
1  EW=(S0+S12)/2−S6
2  EW=(S0+S12)/2−S6
3  EW=−S1+S5−S7+S11
4  EW=−S1+S5−S7+S11
5  EW=−(S0+S12)/2+S6
6  EW=−(S0+S12)/2+S6
7  EW=S1−S5+S7−S11

The number from output 106 is transferred to the input of a multiplier 108. The number GW from output 114 of the sample phase error feedback gain 86 is a number selected from two constants named GCW and GSW by the input number from the octant output 84. This number from output 114 determines the time constant of the correction to the feedback sample phase WF 120. The octant determines the value of GW as follows:

| 0 | GW | = | GCW |
| 1 | GW | = | GSW |
| 2 | GW | = | GSW |
| 3 | GW | = | GCW |
| 4 | GW | = | GCW |
| 5 | GW | = | GSW |
| 6 | GW | = | GSW |
| 7 | GW | = | GCW |

The number from output 114 is transferred to the multiplier 108. The multiplier 108 forms the product of the sample phase error output 106 and the sample phase error feedback gain output 114. This product 116 is transferred to an adder 118. The adder 118 constitutes an integral servo, which takes as input the feedback sample phase 120a, from the previous modulation cycle and adds it to the scaled sample phase error 116. The new feedback modulation depth 120 is transferred to a sine generator 122.

The output 124 from the clock 42 is the sine generator update clock that triggers the sine generator 122 to compute a new value for output 126. The ADC sine generator clock signal 124 has the same rate as the ADC sample clock 44 so there are twelve steps in the analog output 132 labeled d(t) of the digital to analog converter 130 during one modulation cycle. The number from output 126 of the sine generator 122 is formed from the current feedback phase 120 and the current step of the sine generator update clock signal 124. The sine generator update clock triggers the addition of π/6 radians to a radian time accumulator t. Therefore, the number from output 126 is:

$$\sin(WF+t)$$

The number from output 126 is transferred to the multiplier 104 after each sine generator update clock signal 124 which will happen twelve times every modulation cycle.

The number from output 128 of the multiplier 104 is formed from the product of the current sine value 126 and the feedback modulation depth 102. Therefore the number from output 128 is:

$$MF \cdot \sin(WF+t)$$

This is transferred to a digital to analog converter 130 (D to A). The analog output 132 of the digital to analog converter 130 is a sine synthesized from twelve analog steps (shown in FIG. 17), which is input to a lowpass filter 134. The filter 134 passes the fundamental of the analog input {d(t)} as the pure sine wave output 34 {D(t)} (shown in FIG. 18).

In the preferred embodiment of the invention shown in FIG. 1, the components of the block diagram can be fabricated from a combination of hardware and programmable elements. One implementation is to make the components enclosed by dashed line, instructions of a digital signal processor 38. The instructions of the digital signal processor 38 would implement sixteen bit fixed point math with a thirty two bit accumulator. In that case, the demodulated output phase DR from output 40 is a thirty two bit signed integer where the lowest twenty bits represent the unsigned output phase H from output 88. The upper twelve bits of DR represent the signed fringe integer. This format gives a scale factor of $2^{20}$ bits per $2\pi$ radians or six microradians per bit and a range of plus or minus 12,868 radians. As should be obvious from the discussion above, many other embodiments are possible, making the invention adaptable to many applications.

Figure 19:
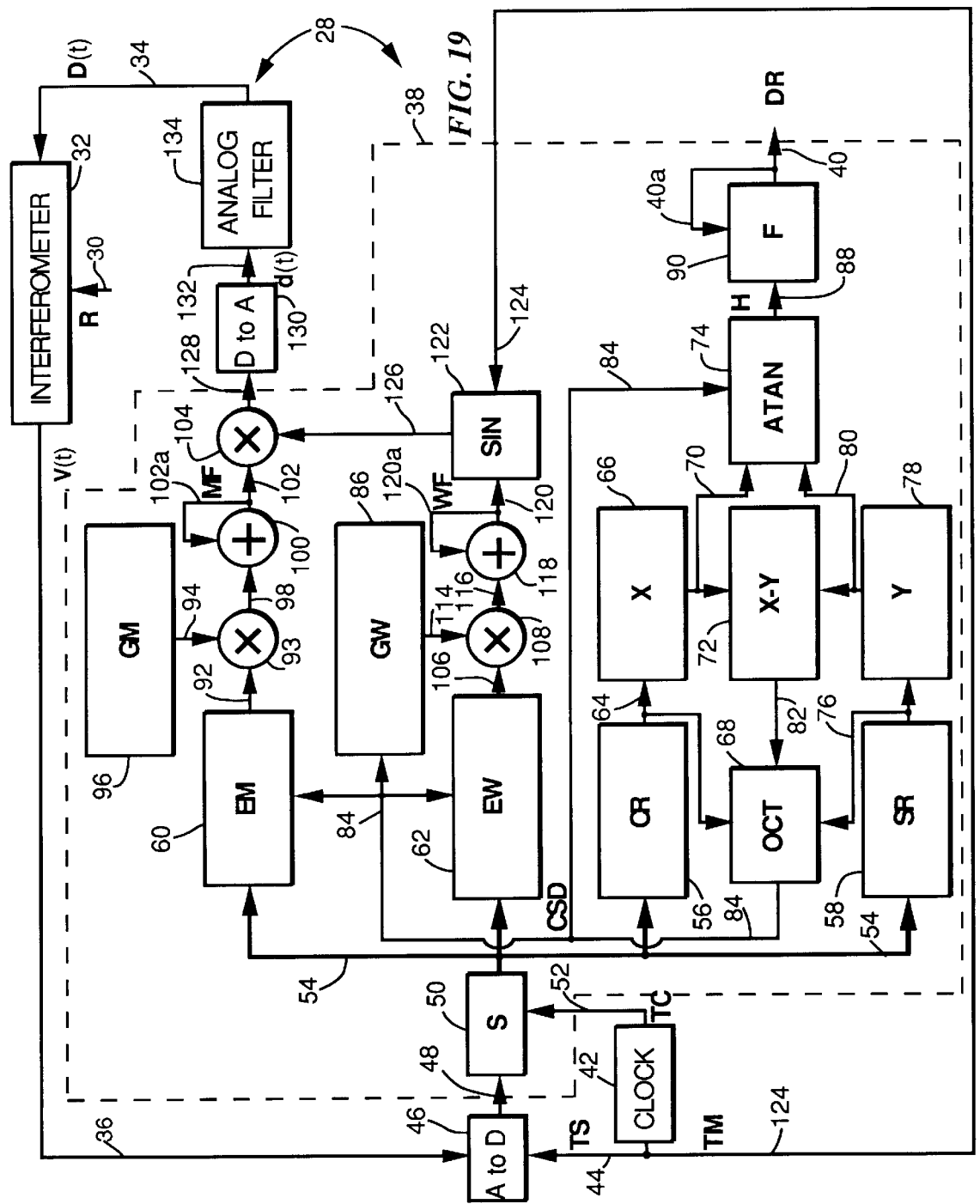
FIG. 19 is the schematic block diagram of FIG. 1 with the labels applied thereto that are used in the software embodiment of the invention.

The following is a listing of typical computation steps to be performed by the digital signal processor 38 to demodulate the input phase 30 with FIG. 19 being a copy of FIG. 1 with the listing names identified with the components of FIG. 1.

The analog to digital converter samples from output 48 are unsigned integers. The digital signal processor program starts with the occurrence of the modulation cycle clock TC from output 52, which signals that twelve samples have been transferred from the sample buffer 50. First, the addresses O0, O1, O2, O3, O4, O5, O6 and O7 of processor instruction groups are assigned to elements of the array OCT which is indexed by the octant number, which is named CSD. The integer computations are performed as shown below and the program transfers to the instruction group for the resulting octant. To demodulate the samples and branch to the current octant:

OCT(0)=O0
OCT(1)=O1
OCT(2)=O7
OCT(3)=O6
OCT(4)=O3
OCT(5)=O2
OCT(6)=O4
OCT(7)=O5

Figure 17:
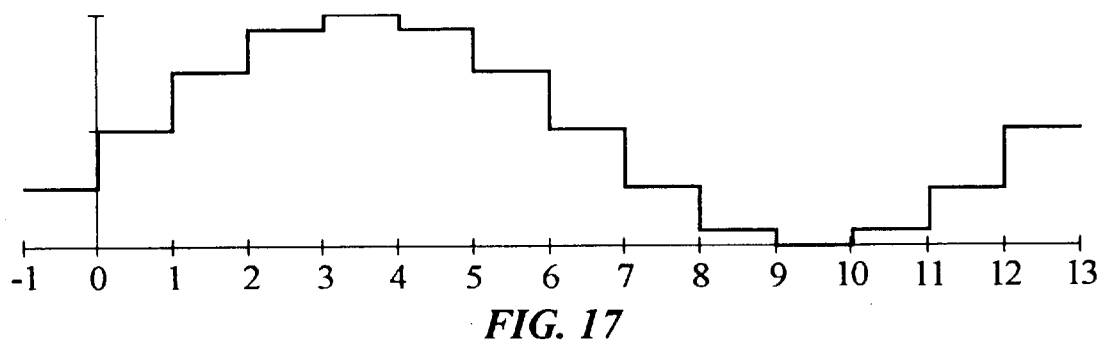
FIG. 17 is a graph of a digitally synthesized modulation sine is used to generate the modulation sine.

$SR=S7+S11-S5-S1$ $Y=abs(SR)$ $CR=(S0+S12)/2-S3+S6-S9$ $X=abs(CR)$ $D=X-Y$ $CSD=D \cdot 2^{-15}+(SR \cdot 2^{-14} \text{ and } 2)+(CR \cdot 2^{-13} \text{ and } 4) \text{ JUMP OCT(CSD)}$ The octant instruction groups each implement the function of blocks 60, 62, 74, 93, 96, 86, 108, 100 and 118 of FIGS. 1 and 17 for the appropriate octant. The computation steps for each of the eight octants are:

O0:

$H=A \text{ TAN } (X,Y)$ $EM=-\{(S0+S12)/2\}+S1-S3+S5-S6+S7-S9+S11$ $MF=GM \cdot EM+MF$ $EW=S1-S5+S7-S11$ $WF=GCW \cdot EW+WF$

O1:

$H=4 \cdot 2^{16}-A \text{ COT}(X,Y)$ $EM=-S3+S9$ $MF=GM \cdot EM+MF$ $EW=\{(S0+S12)/2\}-S6$ $WF=GSW \cdot EW+WF$

O2:

$H=4 \cdot 2^{16}-A \text{ COT}(X,Y)$ $EM=-S3+S9$ $MF=GM \cdot EM+MF$ $EW=\{(S0+S12)/2\}-S6$ $WF=GSW \cdot EW+WF$

O3:

$H=8 \cdot 2^{16}-A \text{ TAN}(X,Y)$ $EM=\{(S0+S12)/2\}-S1+S3-S5+S6-S7+S9-S11$ $MF=GM \cdot EM+MF$ $EW=-\{(S0+S12)/2\}S1+S5-S7+S11$ $WF=GCW \cdot EW+WF$

O4:

$H=8 \cdot 2^{16}+A \text{ TAN}(X,Y)$ $EM=\{(S0+S12)/2\}-S1+S3-S5+S6-S7+S9-S11$ $MF=GM \cdot EM+MF$ $EW=-S1+S5-S7+S11$ $WT=GCW \cdot EW+WF$

O5:

$H=12 \cdot 2^{16}-A \text{ COT}(X,Y)$ $EM=S3-S9$ $MF=GM \cdot EM+MF$ $EW=-(S0+S12)/2\}+S6$ $WF=GSW \cdot EW+WF$

O6:

$H \ 12 \cdot 2^{16} A \text{ COT}(X,Y)$ $EM=S3-S9$ $MF=GM \cdot EM+MF$ $EW=-\{(S0+S12)/2\}+S6$ $WF=GSW \cdot EW+WF$

O7:

$H=16 \cdot 2^{19}-A \text{ TAN}(X,Y)$ $EM=-\{(S0+S12)/2\}+S1-S3+S5-S6+S7-S9+S11$ $MF=GM \cdot EM+MF$ $EW=S1-S5+S7-S11$ $WF=GCW \cdot EW+WF$ The feedback modulation depth MF and the feedback phase of the modulation WF are thirty two bit unsigned integers. The thirty two bits of the feedback phase of the modulation WF spans $2\pi$. The inverse tangent block 74 has been implemented as calls to either an inverse tangent subroutine A TAN(X,Y) or an inverse cotangent subroutine A COT(X,Y) as determined by the octant number. The computation steps to find the inverse tangent or inverse cotangent if in the first octant are:

```
ATAN(X,Y)
    if {27146·X−Y·2¹⁶} ≧ 0 then
        B1 = {2Y}2¹⁶/X
        return (GETZ (B1))
    else
        B1 = (X·2¹⁶−Y·2¹⁶)·2/(X+Y)
        return (2¹⁷−GETZ (B1))
ACOT(X,Y):
    if {27146·Y−X·2¹⁶} ≧ 0 then
        B1 = {2X}2¹⁶/Y
        return (GETZ (B1))
    else
        B1 = (Y·2¹⁶−X·2¹⁶)·2/(X+Y)
        return (2¹⁷−GETZ (B1))
```

The inverse tangent and cotangent subroutines call in turn the series evaluation subroutine GETZ(B1).

A0=41721
A3=55629
B5=8344
B7=1490
B9=290
B11=59
GETZ(B1):
B2=B1·B1·2$^{-16}$
D4=B9−B11·2$^{-16}$
D3=B7−B2·D4·2$^{-16}$
D2=B5−B2·D3·2$^{-16}$
D1=A3−B2·D2·2$^{-16}$
D0=B2·D1·2$^{-16}$
return {{(−B1·D0·2$^{-4}$+A0·B1}2$^{-16}$+1}

The fringe instruction group, which adds the fringe to the $2\pi$ output phase, implements block 90, and results in the thirty two bit signed demodulated output phase DR is:

```
HR = DR and 0FFFFFh
FRINGE = DR and 0FFF00000h
if H ≧ HR then
    if H−HR > 2¹⁹ then
        DR = FRINGE−2²⁰+H
    else
        DR = FRINGE+H
else
    if HR−H > 2¹⁹ then
        DR = FRINGE+2²⁰+H
    else
        DR = FRINGE+H
```

Figure 18:
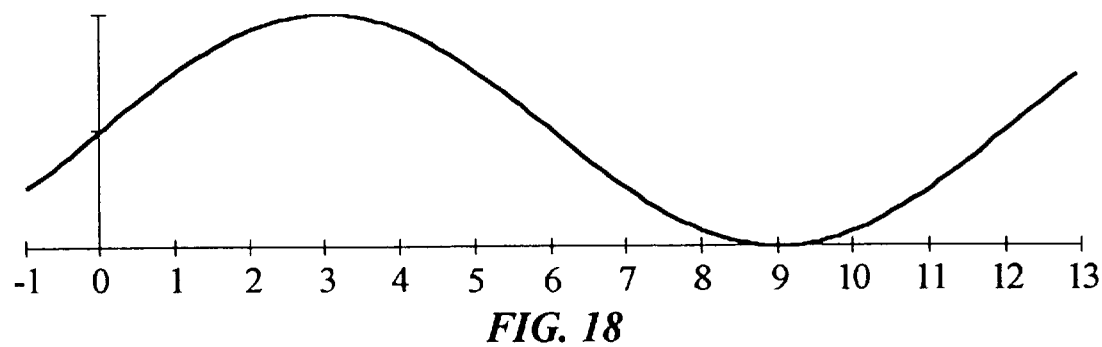
FIG. 18 is a graph of a modulation sine that drives the interferometer of FIG. 1.

The sine generator 122 updates its output value 126 and causes a new D to A input 128 to be presented to the digital to analog converter 130 at every occurrence of the clock output 124 labeled TM. The sine generator 122 uses two tables that are initialized before the demodulation starts. The first:

$$K(J)=J·65536/12$$

shown as the table K, which holds the twelve unsigned phase update points so that the index J goes from zero to eleven. The second is the sine table U $$U(I)=32767·\sin(I·2\pi/1024)+32768$$

which has 1024 entries so that the index I goes from 0 to 1023. The size of the tables can be changed in other embodiments and will work in the same manner. The counter STEP will increment by one for every occurrence of the clock TM and roll back to a value of zero when it reaches twelve. A sixteen bit unsigned index IND $$IND=(K(STEP)+WF·2^{-16}) \text{ and OFFFFh}$$

is computed from the current value of STEP and the current feedback phase of the modulation WF. The index is computed modulo 65536. The D to A output $$D \text{ to } A=\{MF·2^{-16}·U(IND·2^6)-MF·2^{-1}+32767·2^{16}\}2^{-16}$$

is computed from highest ten bits of the index IND and the current unsigned 32 bit feedback modulation depth MF. The highest 12 bits of D to A are used. The analog output 132 generated by the D to A values is shown in FIG. 17. The analog output 34 of the lowpass filter 134 is shown in FIG. 18.

The above description and theory of operation should not be construed as limiting the scope of the invention. Many other embodiments are possible that maintain the essence of orthogonal demodulation. An important variant is to eliminate the generation of the sine modulation and therefore computation of the error terms EM and EW. This may need to be done in time domain multiplexed sensors systems where an external sine dither of a common source wavelength provides the phase modulation for all the sensors. In this case, the modulation depth and phase of the modulation would be different for each sensor. The computation of the input phase R for a particular sensor would follow the same procedure as outlined except that a gain balance G for that sensor would be added. The gain balance would modify the magnitude components as shown below:

$$X=(1-G)·|CR|$$

$$Y=G·|SR|$$

The gain balance constant G would be calibrated to correct for the scale factor difference between X and Y due to non optimum values of the modulation depth M and phase of modulation W. Another variation along this line would be to change the samples from twelve per modulation cycle to six. This can be done as long as the modulation sine is not to be controlled by the error terms EM and EW. The samples per modulation cycle can be any number as long as the orthogonal conditions are met.

The design parameters of the orthogonal demodulation system are also flexible. The time interval TM that strobes the sine generator update can as well be any number instead of the stated twelve per modulation cycle. A higher number would obviously lessen the requirements on the following lowpass filter and a lower number would decrease the computations. The defined number of bits of the computation variables can be changed as well without changing the underlying approach. A floating point digital signal processor could be used. More terms added to the inverse tangent series would improve the resolution and more bits in the fringe counter would increase the dynamic range.

The hardware implementation is also flexible. A low cost digital signal processor would provide a simple system but replacing components with hardware equivalents would increase the maximum operation speed. The fastest implementation may be the design of a complete application specific integrated circuit that would include the analog components as well.

In review, a device is present in the interferometer that introduces a phase shift at a constant frequency resulting in an analog output of:

$$V(t)P_{dc}+P_{ac}\cos\{R+M\sin(t+W)\}$$

where M is the modulation depth of the interferometer, W is the phase of the modulation of the interferometer and t is the linearly increasing time in units of radians. The modulation phase defined by the term:

$$M\sin(t+W)$$

in the cosine argument is the result of a single frequency sinusoidal drive output applied to the interferometer.

Thus, there has been shown novel demodulation apparatus and demodulation method which fulfill all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

What is claimed is:

1. An apparatus for determining the phase of a phase shifting interference signal between a phase modulated sensor signal and a sinusoidal feedback signal including:

means for sampling successive cycles of phase shifting interference signals;

an odd modulation component amplitude generator operatively connected to receive some of the samples of the phase shifting interference signals centered on each successive sampling cycle, and to produce therefrom odd modulation amplitude signals;

an even modulation component amplitude generator operatively connected to receive some of the samples of the phase shifting interference signals of each sampling cycle and at least one phase shifting interference signal from the next sampling cycle, and to produce therefrom even modulation amplitude signals for times centered with the samples of the phase shifting interference signals used to produce the odd modulation amplitude signals;

an octant generator operatively connected to receive the magnitudes of the even and odd modulation amplitude signals and from the magnitudes of the even and odd modulation amplitude signals and the difference between the magnitudes of the even and odd modulation amplitude signals produce octant signals which represent the octant of a phase vector having the even modulation amplitude signal as a first orthogonal ordinate and the odd modulation amplitude signal as a second orthogonal ordinate;

means to produce the sinusoidal feedback signal from the octant signals and the successive phase shifting interference signals, for feeding back to an interferometer producing the phase shifting interference signal to stabilize the modulation depth and the phase of the modulation of the interferometer; and an inverse tangent generator connected to the octant signals and the magnitudes of the even and odd modulation amplitude signals to produce therefrom output phase signals representing the phase of the phase modulated sensor signal.

2. The apparatus as defined in claim 1 further including:

a fringe generator connected to said inverse tangent generator to compare successive output phase signals thereof for fringe crossings and to produce cumulative phase signals, each of which are the latest output phase signal to which said fringe generator adds or subtracts 2π radians to the previous cumulative phase signal depending on the direction of fringe crossing.

3. The apparatus as defined in claim 1 wherein the speed change in phase between successive cycles of the output phase signals is limited to less than π radians, said apparatus further including:

a fringe generator connected to said inverse tangent generator to compare output signals thereof for at least π radians difference, which indicate a phase fringe crossing, and to produce cumulative phase signals by adding 2π radians to the phase of the sensor signal when the output signal decreases by at least π radians and by subtracting 2π radians from the phase of the sensor signal when the output signal increases by at least π radians.

4. The apparatus as defined in claim 1 wherein said means to produce the sinusoidal feedback signal produce a fixed frequency sinusoidal feedback signal that when fed back to the interferometer stabilizes the modulation depth within the interferometer about π radians.

5. The apparatus as defined in claim 1 further including:

an interferometer to which the phase modulated sensor signal and the sinusoidal feedback signal are fed, said interferometer producing the phase shifting interference signal therefrom.

6. The apparatus as defined in claim 5 wherein said means to produce the sinusoidal feedback signal produce a fixed frequency sinusoidal feedback signal that when fed back to said interferometer stabilizes the modulation depth within said interferometer about π radians.

7. The apparatus as defined in claim 5 wherein the phase shifting interference signal has a fixed modulation cycle and said means for sampling successive cycles of the phase shifting interference signals sample first through twelfth samples per modulation cycle and the first sample of the next modulation cycle, said even modulation component amplitude generator adding the half the first samples, and the seventh sample, and subtracting therefrom the fourth sample and the tenth sample of each modulation cycle to produce even modulation amplitude signals, and said odd modulation component amplitude generator adding the eighth sample and the twelfth sample, and subtracting therefrom the second sample and the sixth sample of each modulation cycle to produce odd modulation amplitude signals.

8. The apparatus as defined in claim 5 wherein the phase shifting interference signal has a fixed modulation cycle and said means for sampling successive cycles of the phase shifting interference signals sample S0 through S11 samples per modulation cycle and S0 of the next modulation cycle, said means to produce the sinusoidal feedback signal from the octant signals and the phase shifting interference signals including:

a sine generator that produces a sine output signal;

a modulation error generator which for O0 through O7 octants combines −S0+S1−S3+S5−S6+S7−S9+S11 for O0, combines −S3+S9 for O1, combines −S3+S9 for O2, combines S0−S1+S3−S5+S6−S7+S9−S11 for O3, combines S0−S1+S3−S5+S6−S7+S9−S11 for O4, combines S3−S9 for O5, combines S3−S9 for O6, and combines −S0+S1−S3+S5−S6+S7−S9+S11 for O7, to produce modulation error signals;

a first adder to combine each new modulation error signal with any previous modulation error signals to produce combined modulation error signals; and a first multiplier to multiply the combined modulation error signals with the sine output signal to produce the sinusoidal feedback signal.

9. The apparatus as defined in claim 8 further including:
a modulation feedback gain generator for producing an adjustable gain signal; and
a second multiplier to multiply each new modulation error signal by the adjustable gain signal before it is combined with the previous combined modulation error signal.

10. The apparatus as defined in claim 8 further including: wherein said sine generator includes:
  a phase error generator which for O0 through O7 octants combines S1−S5+S7−S11 for O0, combines S0−S6 for O1, combines S0−S6 for O2, combines −S1+S5−S7+S11 for O3, combines −S1+S5−S7+S11 for O4, combines −S0+S6 for O5, combines −S0+S6 for O6, and combines S1−S5+S7−S11 for O7, to produce a phase error generator output;
  a phase error feedback gain generator which produces a first constant when in octants O0, O3, O4, and O7, and a second constant when in octants O1, O2, O5, and O6;
  a second multiplier to multiply the constant produced by said phase error feedback gain generator and the phase error generator output to produce phase error feedback signals; and
  a second adder to combine each new phase error feedback signal with any previous phase error feedback signals to produce a phase controlling signal to said sine generator.

11. The apparatus as defined in claim 10 further including:
a modulation feedback gain generator for producing an adjustable gain signal; and
a third multiplier to multiply each new modulation error signal by the adjustable gain signal before it is combined with the previous modulation error signal.

12. The apparatus as defined in claim 11 further including:
a digital to analog converter connected to receive the sinusoidal feedback signal to convert it from digital form to analog form; and
a lowpass filter to smooth the analog sinusoidal feedback signal.

13. The apparatus as defined in claim 1 wherein said odd modulation component amplitude generator and said even modulation component amplitude generator are operatively connected to receive the samples of the phase shifting interference signals that result in symmetry of the odd and even components between the first and last sample, whereby errors that could be caused by linear changes in the optical power over a cycle are rejected.

14. The apparatus as defined in claim 1 wherein said even modulation component amplitude generator is operatively connected to receive the samples of the phase shifting interference signals that result in symmetry of the even component between the first sample S0 and last sample S12, so that the even component is formed by S3+S9−(S0+S12)/2−S6.

15. An open loop method for measuring the phase shift in each modulation cycle of a time varying signal between a sensor signal that is phase modulated by an external effect and a sinusoidal signal whose amplitude and phase are controlled that are combined to interfere with each other so that the external effect can be determined including:

digitizing each modulation cycle of the time varying signal;

sampling portions of each modulation cycle of the digitized time varying signal;

combining selected sample portions of each modulation cycle into an even modulation signal for each modulation cycle;

determining the magnitude of the even modulation signal for each modulation cycle;

combining selected sample portions of each modulation cycle into an odd modulation signal for each modulation cycle, said samples combined being chosen so that the samples used to combine into the odd and even modulation signals are centered about the same time;

determining the magnitude of the odd modulation signal for each modulation cycle;

producing an octant signal representative of the octant of the phase shift from the even modulation signal, the odd modulation signal and the difference there between; and determining the inverse tangent of orthogonal combination of the magnitude of the odd modulation signal, and the magnitude of the odd modulation signal in the octant as determined by the octant signal to determine the phase shift in each modulation cycle of a time varying signal.

16. The open loop method as defined in claim 15 wherein said sampling of said portions of each modulation cycle of the digitized time varying signal includes:
sampling at least thirteen portions.

17. The open loop method as defined in claim 15 wherein said sampling of said portions of each modulation cycle of the digitized time varying signal includes:
sampling at least portions one, two, four, six, seven, eight, ten, and twelve of a twelve portion modulation cycle, and the first portion of the next modulation cycle, said combining selected sample portions of each modulation cycle into an even modulation signal for each modulation cycle includes:
adding portion one and the first portion of the next modulation cycle, dividing the result by two, adding sample seven, and subtracting therefrom samples four and ten, and said combining selected sample portions of each modulation cycle into an odd modulation signal for each modulation cycle includes:
adding portions eight and twelve, and subtracting therefrom samples two and six.

18. The open loop method as defined in claim 15 further including:
sampling at least portions one, two, four, six, seven, eight, ten, and twelve of a twelve portion modulation cycle, and the first portion of the next modulation cycle;
controlling the amplitude and phase of the sinusoidal signal by:
producing a sine output signal;
producing modulation error signals from the sample portions by:
adding portions two, six, eight, and twelve and subtracting portions one, four, seven, and ten therefrom when the phase is in the first octant;
subtracting portion four from portion ten when the phase is in the second octant;
subtracting portion four from ten portion when the phase is in the third octant;
adding portions one, four, seven, and ten and subtracting portions two, six, eight, and twelve therefrom when the phase is in the fourth octant;

adding portions one, four, seven, and ten and subtracting portions two, six, eight, and twelve therefrom when the phase is in the fifth octant;

subtracting portion ten from portion four when the phase is in the sixth octant;

subtracting sample ten from sample four when the phase is in the seventh octant; and adding portions two, six, eight, and twelve and subtracting portions one, four, seven, and ten therefrom when the phase is in the eighth octant.

19. The open loop method as defined in claim 18 further including:

adding each new modulation error signal with any previous modulation error signals to produce combined modulation error signals; and multiplying each combined modulation error signal with the sine output signal to produce the sinusoidal signal.

20. The open loop method as defined in claim 19 further including:

producing an adjustable gain signal;

multiplying each new modulation error signal by the adjustable gain signal before it is combined with the previous combined modulation error signal.

21. The open loop method as defined in claim 20 further including:

adjusting the phase of the sine output signal by:
producing a phase error output by:
adding portions two and eight and subtracting portions six and twelve therefrom when the phase is in the first octant;
subtracting portion seven from portion one when the phase is in the second octant;
subtracting portion seven from portion one when the phase is in the third octant;
adding portions six and twelve and subtracting portions two and eight therefrom when the phase is in the fourth octant;
adding portions six and twelve and subtracting portions two and eight therefrom when the phase is in the fifth octant;
subtracting portion one from portion seven when the phase is in the sixth octant;
subtracting portion one from portion seven when the phase is in the seventh octant; and
adding portions two and eight and subtracting portions six and twelve therefrom when the phase is in the eighth octant;

producing a first constant when the phase is in the first, fourth, fifth, or eighth octants, and a second constant when the phase is in the second, third, sixth, or seventh octants;

multiplying the produced constant and the phase error output to produce phase error feedback signals;

adding each new phase error feedback signal with any previous phase error feedback signals to produce a phase controlling signal; and combining the phase of the sine output signal with the phase error signal.

22. The open loop method as defined in claim 21 further including:

producing an adjustable gain signal;

multiplying each new modulation error signal by the adjustable gain signal before it is combined with the previous modulation error signal.

23. The open loop method as defined in claim 22 further including:

converting the sinusoidal signal into analog form; and a lowpass filtering the converted sinusoidal signal to smooth the analog sinusoidal signal;

said samples combined being chosen so that the samples used to combine into the odd and even modulation signals are centered about the same time.

24. The open loop method as defined in claim 15 further including:

chosing said samples combined being chosen so that the even modulation signal is symmetrical from the first to last sample.

25. A demodulator apparatus for an interferometer to measure the phase of an analog output of the interferometer including:

an analog to digital converter, which samples the analog output of the interferometer;

a digital signal processor; and a clock producing:
a first clock signal; and
a second clock signal at least every twelve first clock signals, the first clock signal being connected to said analog to digital converter to cause at least thirteen samples of the analog output to be taken by said analog to digital converter and operatively connected to the interferometer to control the length of one modulation period, and the second clock signal being connected to said digital signal processor to control passage of the at least thirteen samples to said digital signal processor from said analog to digital converter to signal that one modulation period has passed, said digital signal processor including:
means to extract from the at least thirteen samples the cosine and sine of the input phase of the analog output of the interferometer, and the amplitude and phase of the sine modulation by summing and differencing said at least thirteen samples in sample pairs one half modulation cycle apart to isolate properties of the interferometer analog output within the octant of the input phase; and
an inverse tangent generator to computed a phase number indicating the input phase within the octant of operation and to add thereto the octant of operation.

26. The demodulator apparatus for an interferometer to measure the phase of an analog output of the interferometer as defined in claim 25 wherein the input phase changes by less than $\pi$ radians during the time of a modulation cycle further including:

means to track fringe crossings and create a cumulative phase number representative of the cumulative change in phase from the start of operation of said demodulator including:
means to add $2\pi$ radians to the cumulative phase number minus the phase number when the phase number decreases by at least $\pi$ radians; and
means to subtract $2\pi$ radians from the cumulative phase number plus the phase number when the phase number increases by at least $\pi$ radians.

27. The demodulator apparatus for an interferometer to measure the phase of an analog output of the interferometer as defined in claim 25 wherein said means to extract from the at least thirteen samples the cosine and sine of the input phase of the analog output of the interferometer do so from at least thirteen samples that cause the cosine to be symmetrical between the first and last sample.

* * * * *